United States Patent
Zhang et al.

(10) Patent No.: US 12,140,413 B2
(45) Date of Patent: Nov. 12, 2024

(54) CELL WINDING CALIBRATION METHOD, APPARATUS, AND DEVICE, AND CELL WINDING SYSTEM

(71) Applicant: CONTEMPORARY AMPEREX TECHNOLOGY CO., LIMITED, Ningde (CN)

(72) Inventors: Xiaowei Zhang, Ningde (CN); Zhiwen Wang, Ningde (CN); Wei Zhang, Ningde (CN); Yuqian Wen, Ningde (CN); Minghao Tang, Ningde (CN); Shengwu Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/620,924

(22) Filed: Mar. 28, 2024

(65) Prior Publication Data

US 2024/0240935 A1    Jul. 18, 2024

Related U.S. Application Data

(63) Continuation of application No. PCT/CN2022/124043, filed on Oct. 9, 2022.

(30) Foreign Application Priority Data

Oct. 14, 2021    (CN) .......................... 202111197958.0

(51) Int. Cl.
*G01B 11/14*    (2006.01)
*H01M 10/04*    (2006.01)

(52) U.S. Cl.
CPC ......... *G01B 11/14* (2013.01); *H01M 10/0409* (2013.01); *H01M 10/0431* (2013.01)

(58) Field of Classification Search
CPC .... G01B 11/14; G01B 11/24; H01M 10/0409; H01M 10/0431; Y10T 29/49108; Y10T 29/49112; Y10T 29/49131
See application file for complete search history.

(56) References Cited

U.S. PATENT DOCUMENTS

| | | | |
|---|---|---|---|
| 4,182,559 A | 1/1980 | Driscoll et al. | |
| 9,404,733 B2 * | 8/2016 | Kabetani | G01B 11/14 |

(Continued)

FOREIGN PATENT DOCUMENTS

| | | |
|---|---|---|
| CN | 104964652 A | 10/2015 |
| CN | 107681202 A | 2/2018 |

(Continued)

OTHER PUBLICATIONS

The World Intellectual Property Organization (WIPO) International Search Report and Written Opinion for PCT/CN2022/124043 Dec. 15, 2022 14 Pages (including translation).
State Intellectual Property Office of China Notice of Grant of Invention Patent Right for Application No. 202111197958.0 Sep. 20, 2023 6 pages (including translation).

*Primary Examiner* — Donghai D Nguyen
(74) *Attorney, Agent, or Firm* — ANOVA LAW GROUP, PLLC

(57) ABSTRACT

A cell winding calibration method includes: obtaining a first reference distance between first and second reference lines; obtaining a reference number of pixels included in the first reference distance, and determining, based on the first reference distance and the reference number of pixels included in the first reference distance, an actual distance corresponding to a single pixel; obtaining an actual number of pixels included in a distance between an edge of a winding substrate and the first or second reference line, and determining real-time position information of the edge of the winding substrate based on the actual number of pixels included in the distance between the edge of the winding substrate and the first or second reference line and the actual (Continued)

distance corresponding to a single pixel; and calibrating the winding substrate based on the real-time position information of the edge of the winding substrate.

20 Claims, 16 Drawing Sheets

(56) References Cited

U.S. PATENT DOCUMENTS 9,411,338 B2 * 8/2016 Hanaoka ............... G01B 11/24
9,847,560 B2 * 12/2017 Kohlberger ....... H01M 10/0587

FOREIGN PATENT DOCUMENTS

| | | |
|---|---|---|
| CN | 109579717 A | 4/2019 |
| CN | 209399939 U | 9/2019 |
| CN | 111416142 A | 7/2020 |
| CN | 111932605 A | 11/2020 |
| CN | 112255759 A | 1/2021 |
| CN | 112577421 A | 3/2021 |
| CN | 212779105 U | 3/2021 |
| CN | 213340470 U | 6/2021 |
| KR | 20180032748 A | 4/2018 |

* cited by examiner

S20

| Obtain, on an inner side surface of a to-be-wound layer, a first reference number of pixels included in a first reference distance | ~ S21 |

| Obtain, on an outer side surface of a wound layer away from a winding axis, a second reference number of pixels included in the first reference distance | ~ S22 |

| Determine, based on a first reference distance and a first reference number of pixels, a first actual distance corresponding to a single pixel | ~ S31 |

| Determine, based on the first reference distance and a second reference number of pixels, a second actual distance corresponding to a single pixel | ~ S32 |

| Obtain an actual number of pixels included in a distance between an edge of an outer side surface of a wound layer and a first reference line or a second reference line | ~ S41 |

| Obtain an actual number of pixels included in a distance between an edge of an inner side surface of a to-be-wound layer and the first reference line or the second reference line | ~ S42 |

| Obtain, on an inner side surface of a to-be-wound layer, a third reference number of pixels included in a second reference distance | — S81 |

↓

| Obtain, on an outer side surface of a wound layer, a fourth reference number of pixels included in the second reference distance | — S82 |

| Determine, based on a second reference distance and a third reference number of pixels, a third actual distance corresponding to a single pixel | — S91 |

↓

| Determine, based on a second reference distance and a fourth reference number of pixels, a fourth actual distance corresponding to a single pixel | — S92 |

| Obtain an actual number of pixels included in a distance between an edge of an outer side surface of a wound layer and a third reference line or a fourth reference line | — S101 |

↓

| Obtain an actual number of pixels included in a distance between an edge of an inner side surface of a to-be-wound layer and the third reference line or the fourth reference line | — S102 |

| Obtain, on an outer side surface of a wound layer, a first actual number of pixels included in a distance between an edge of one end of a first electrode plate and a first reference line or a second reference line | ~ S411 |

↓

| Obtain a second actual number of pixels included in a distance between an edge of one end of a first separator and the first reference line or the second reference line | ~ S412 |

| Obtain, on an inner side surface of a to-be-wound layer, a third actual number of pixels included in a distance between an edge of one end of a second electrode plate and a first reference line or a second reference line | ~ S421 |

↓

| Obtain a fourth actual number of pixels included in a distance between an edge of one end of a second separator and the first reference line or the second reference line | ~ S422 |

| Obtain, on an outer side surface of a wound layer, a fifth actual number of pixels included in a distance between an edge of the other end of a first electrode plate and a third reference line or a fourth reference line | ~ S111 |

↓

| Obtain a sixth actual number of pixels included in a distance between an edge of the other end of a first separator and the third reference line or the fourth reference line | ~ S112 |

Obtain, on an inner side surface of a to-be-wound layer, a seventh actual number of pixels included in a distance between an edge of the other end of a second electrode plate and a third reference line or a fourth reference line ~ S121

Obtain an eighth actual number of pixels included in a distance between an edge of the other end of a second separator and the third reference line or the fourth reference line ~ S122

*FIG. 18*

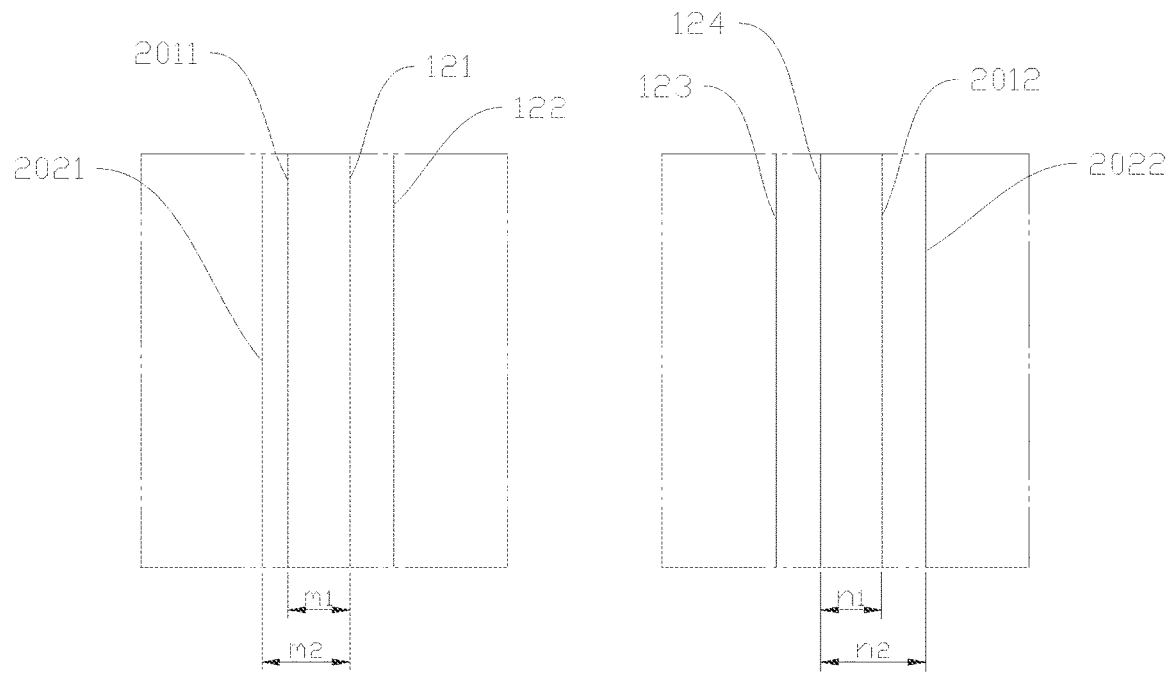
FIG. 19a
FIG. 19c
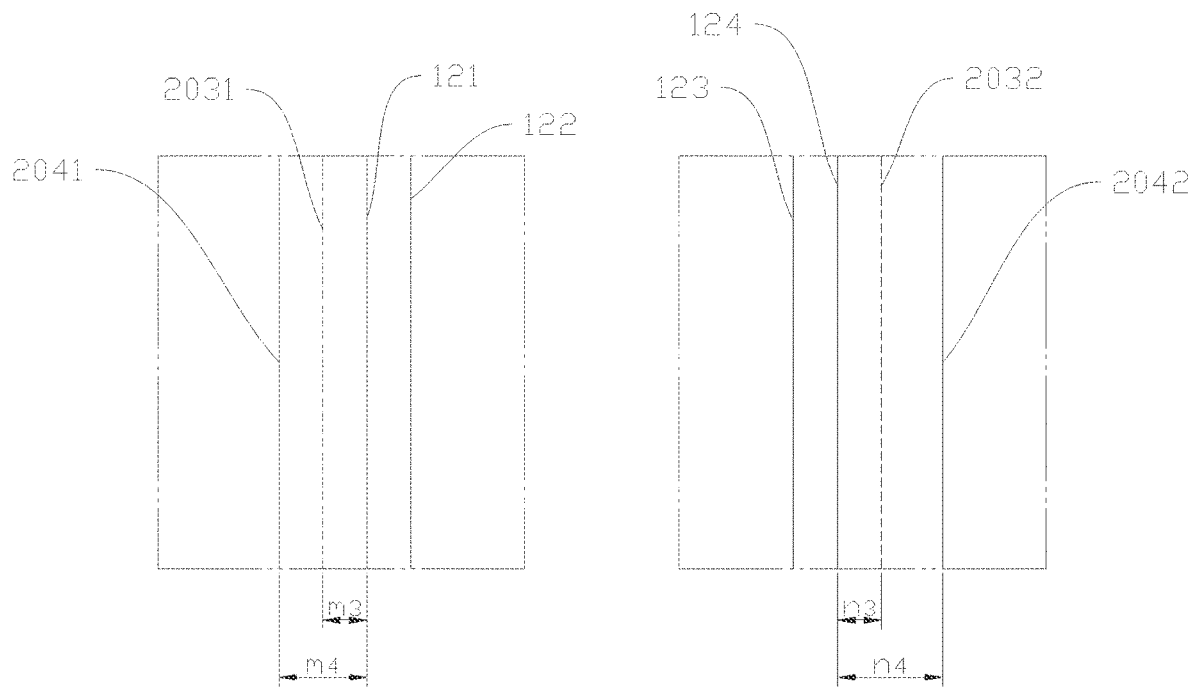
FIG. 19b
FIG. 19d

S50

```
Determine real-time position information of an edge of one end of a first electrode
plate based on a first actual number of pixels and a first actual distance                — S51

Determine real-time position information of an edge of one end of a first separator
based on a second actual number of pixels and the first actual distance                   — S52

Determine real-time position information of an edge of one end of a second electrode
plate based on a third actual number of pixels and a second actual distance               — S53

Determine real-time position information of an edge of one end of a second separator
based on a fourth actual number of pixels and the second actual distance                  — S54
```

```
Determine real-time position information of an edge of the other end of a first
electrode plate based on a fifth actual number of pixels and a third actual distance      — S1101

Determine real-time position information of an edge of the other end of a first
separator based on a sixth actual number of pixels and the third actual distance          — S1102

Determine real-time position information of an edge of the other end of a second
electrode plate based on a seventh actual number of pixels and a fourth actual
distance                                                                                  — S1103

Determine real-time position information of an edge of the other end of a second
separator based on an eighth actual number of pixels and the fourth actual distance       — S1104
```

CELL WINDING CALIBRATION METHOD, APPARATUS, AND DEVICE, AND CELL WINDING SYSTEM

CROSS-REFERENCE TO RELATED APPLICATIONS

This application is a continuation of International Application No. PCT/CN2022/124043, filed on Oct. 9, 2022, which claims priority to Chinese patent application no. 202111197958.0, filed on Oct. 14, 2021, and entitled "CELL WINDING CALIBRATION METHOD AND DEVICE", the entire contents of both of which are incorporated herein by reference.

TECHNICAL FIELD

Embodiments of the present application relate to the field of battery technologies, and specifically to a cell winding calibration method, apparatus, and device, and a cell winding system.

BACKGROUND ART

In some cases, a battery cell may be formed through stacking or winding. The wound cell includes electrode plates and a separator. The separator is mainly used to separate the electrode plates to avoid a short circuit caused by contact between the electrode plates. Therefore, in a winding process of the wound cell, a distance between edges of the separator and the electrode plate needs to meet a requirement.

The applicant found in research that currently, in a winding process of a cell, after a focal length of an image acquisition apparatus is set, the image acquisition apparatus captures an image of a surface of the cell to detect the distance between the edges of the electrode plate and the separator. However, as the cell is wound, a thickness of the cell correspondingly increases, which causes a deviation between the set focal length of the image acquisition apparatus and an actual distance between the image acquisition apparatus and the cell, causing problems such as image blurring. As a result, there is a detection error.

SUMMARY

In view of the above problem, embodiments of the present application provide a cell winding calibration method, apparatus, and device, and a cell winding system, so as to improve cell edge position detection accuracy and ensure cell winding calibration precision.

According to an aspect of the embodiments of the present application, there is provided a cell winding calibration method, including: obtaining a first reference distance between a first reference line and a second reference line, where the first reference line and the second reference line are parallel identification lines formed on a winding substrate, and the first reference distance remains unchanged in a cell winding process; obtaining a reference number of pixels included in the first reference distance; determining, based on the first reference distance and the reference number of pixels included in the first reference distance, an actual distance corresponding to a single pixel; obtaining an actual number of pixels included in a distance between an edge of the winding substrate and the first reference line or the second reference line; determining real-time position information of the edge of the winding substrate based on the actual number of pixels included in the distance between the edge of the winding substrate and the first reference line or the second reference line and the actual distance corresponding to a single pixel; and calibrating the winding substrate based on the real-time position information of the edge of the winding substrate.

According to the present application, the actual distance corresponding to a single pixel is determined based on the obtained first reference distance between the first reference line and the second reference line and the reference number of pixels included in the first reference distance. The first reference line and the second reference line are parallel identification lines formed on the winding substrate, and the first reference distance remains unchanged in the cell winding process. Therefore, in the winding process, even though a thickness of the winding substrate increases, an object distance changes, and a resolution of an acquired image changes accordingly, the actual distance corresponding to a single pixel can still be accurately determined. The first reference line and the second reference line are parallel identification lines formed on the winding substrate, so that the first reference line and the second reference line are easier to recognize during imaging. In addition, to avoid difficulty in clearly recognizing a distance between edges of a separator and an electrode plate due to an image blur and an excessively short distance between the edges of the separator and the electrode plate, numbers of pixels included in distances between the edges of the separator as well as the electrode plate in the winding substrate and the first reference line or the second reference line are read and combined with the actual distance corresponding to a single pixel to accurately determine the real-time position information of the edge of the winding substrate, so as to accurately and effectively calibrate the edge of the winding substrate. In this way, a qualification rate of winding the winding substrate is ensured.

In an optional implementation, the reference number of pixels included in the first reference distance is at least one. That the reference number of pixels included in the first reference distance is at least one means that in an image of the winding substrate acquired by an image acquisition unit, the distance between the first reference line and the second reference line includes at least one pixel block, for a purpose of accurately obtaining the actual distance corresponding to a single pixel and avoiding a failure or error, due to that the first reference distance in the image is excessively short, in obtaining the reference number of pixels included in the first reference distance.

In an optional implementation, the first reference line and the second reference line are parallel identification lines formed on two opposite surfaces of the winding substrate. The first reference line and the second reference line are formed on the two opposite surfaces of the winding substrate. This helps recognize the distance between the edge of the winding substrate and the first reference line or the second reference line, so as to determine the real-time position information of the edge of the winding substrate.

In an optional implementation, the winding substrate includes a wound layer formed after a winding operation already performed and a to-be-wound layer on which a winding operation is to be performed. The obtaining a reference number of pixels included in the first reference distance includes: obtaining, on an inner side surface of the to-be-wound layer, a first reference number of pixels included in the first reference distance; and obtaining, on an outer side surface of the wound layer away from a winding axis, a second reference number of pixels included in the first reference distance. The inner side surface of the to-be-wound layer and the outer side surface of the wound layer correspond to the two opposite surfaces of the winding substrate, respectively. The winding substrate generally includes a positive electrode plate, a first separator, a negative electrode plate, and a second separator. Surface areas of the separators are larger than those of the positive electrode plate and the negative electrode plate, so that the separators can completely isolate the positive electrode plate from the negative electrode plate, to avoid a risk of a short circuit caused by contact between the electrode plates. In general, the separator is transparent to some extent, but the electrode plate is not transparent. Therefore, considering that when image acquisition is performed from one side of the winding substrate, edges of only one electrode plate and only one separator can be seen, and edges of the electrode plate and the separator that are away from the image acquisition unit cannot be acquired, in the present application, the first reference line and the second reference line are formed on both the outer side surface of the wound layer and the inner side surface of the to-be-wound layer, and image acquisition is performed on the outer side surface of the wound layer and the inner side surface of the to-be-wound layer at a time, to implement image acquisition and recognition of the edges of both electrode plates and both separators. In addition, blurring of a part of surface during imaging of the winding substrate due to a small depth of field of the image acquisition unit can be effectively avoided. Image acquisition is performed on the inner side surface of the to-be-wound layer and the outer side surface of the wound layer separately, so that high resolutions are ensured in imaging of both the inner side surface of the to-be-wound layer and the outer side surface of the wound layer, and images are sharp. This helps improve precision of detecting a position of the edge of the winding substrate.

In an optional implementation, the determining, based on the first reference distance and the reference number of pixels included in the first reference distance, an actual distance corresponding to a single pixel includes: determining, based on the first reference distance and the first reference number of pixels, a first actual distance corresponding to a single pixel; and determining, based on the first reference distance and the second reference number of pixels, a second actual distance corresponding to a single pixel. The first actual distance and the second actual distance that correspond to a single pixel in two images are determined based on the first reference distance, the first reference number of pixels, and the second reference number of pixels, so that sharpness of the images can be ensured, and the precision of detecting the position of the edge of the winding substrate can be improved.

In an optional implementation, the obtaining an actual number of pixels included in a distance between an edge of the winding substrate and the first reference line or the second reference line includes: obtaining an actual number of pixels included in a distance between an edge of the outer side surface of the wound layer and the first reference line or the second reference line; and obtaining an actual number of pixels included in a distance between an edge of the inner side surface of the to-be-wound layer and the first reference line or the second reference line. The edge of the winding substrate is an edge of one side in a width direction of the winding substrate. The actual numbers of pixels respectively included in the distance between the edge of the outer side surface of the wound layer and the first reference line or the second reference line and in the distance between the edge of the inner side surface of the to-be-wound layer and the first reference line or the second reference line are obtained to precisely detect position information of the edges of the two electrode plates and the two separators in the winding substrate.

In an optional implementation, in the width direction of the winding substrate, the first reference line and the second reference line are located at one end of the winding substrate. The method further includes: obtaining a second reference distance between a third reference line and a fourth reference line. The third reference line and the fourth reference line are located at the other end of a surface of the winding substrate opposite to the first reference line and the second reference line. The third reference line and the fourth reference line are parallel identification lines. The second reference distance remains unchanged in the cell winding process. The first reference line and the second reference line are formed on a surface of one end of the winding substrate, and the third reference line and the fourth reference line are formed on a surface of the other end. In this way, it is ensured that there are two reference lines in each of images of edges of the two ends of the winding substrate when the image of the edges needs to be obtained, so that the detection accuracy can be ensured. In addition, a framing imaging area of the image acquisition unit can be reduced, the acquired image can be optimized, and the detection precision can be improved.

In an optional implementation, the method further includes: obtaining a reference number of pixels included in the second reference distance; and determining, based on the second reference distance and the reference number of pixels included in the second reference distance, the actual distance corresponding to a single pixel. The reference number of pixels included in the second reference distance in the image is obtained, and the actual distance corresponding to a single pixel in the image is determined based on the second reference distance and the reference number of pixels included in the second reference distance. In this way, a position of an edge of the other end of the winding substrate in the image is detected.

In an optional implementation, the method further includes: obtaining an actual number of pixels included in a distance between the edge of the winding substrate and the third reference line or the fourth reference line. The actual number of pixels included in the distance between the edge of the winding substrate and the third reference line or the fourth reference line is obtained and combined with the actual distance corresponding to a single pixel to determine an actual distance between the edge of the other end of the winding substrate and the third reference line or the fourth reference line, so as to obtain real-time position information of the edge of the other end of the winding substrate and further determine whether the position of the edge of the other end of the winding substrate needs to be calibrated.

In an optional implementation, when the winding substrate includes the wound layer formed after the winding operation already performed and the to-be-wound layer on which the winding operation is to be performed, the obtaining a reference number of pixels included in the second reference distance includes: obtaining, on the inner side surface of the to-be-wound layer, a third reference number of pixels included in the second reference distance; and obtaining, on the outer side surface of the wound layer, a fourth reference number of pixels included in the second reference distance. The third reference number of pixels included in the second reference distance is obtained on the inner side surface of the to-be-wound layer, and the fourth reference number of pixels included in the second reference distance is obtained on the outer side surface of the wound layer. In this way, a problem that an image including both ends of the winding substrate cannot be acquired due to a limited image acquisition range is solved.

In an optional implementation, the determining, based on the second reference distance and the reference number of pixels included in the second reference distance, the actual distance corresponding to a single pixel includes: determining, based on the second reference distance and the third reference number of pixels, a third actual distance corresponding to a single pixel; and determining, based on the second reference distance and the fourth reference number of pixels, a fourth actual distance corresponding to a single pixel. The third actual distance and the fourth actual distance that correspond to a single pixel in two images are determined based on the second reference distance, the third reference number of pixels, and the fourth reference number of pixels, so that blurring of a part of surface during imaging of the winding substrate due to a small depth of field of the image acquisition unit can be effectively avoided. Image acquisition is performed on the inner side surface of the to-be-wound layer, the outer side surface of the wound layer, and each end separately, so that high resolutions are ensured in imaging of the edges of the two ends of both the inner side surface of the to-be-wound layer and the outer side surface of the wound layer, and the images are sharp. This helps improve the precision of detecting the positions of the edges of both ends of the winding substrate.

In an optional implementation, when the winding substrate includes the wound layer formed after the winding operation already performed and the to-be-wound layer on which the winding operation is to be performed, the obtaining an actual number of pixels included in a distance between the edge of the winding substrate and the third reference line or the fourth reference line includes: obtaining an actual number of pixels included in a distance between the edge of the outer side surface of the wound layer and the third reference line or the fourth reference line; and obtaining an actual number of pixels included in a distance between the edge of the inner side surface of the to-be-wound layer and the third reference line or the fourth reference line. The actual numbers of pixels respectively included in the distance between the edge of the outer side surface of the wound layer and the third reference line or the fourth reference line and in the distance between the edge of the inner side surface of the to-be-wound layer and the third reference line or the fourth reference line are obtained to precisely detect position information of the edge of one end of each of the two electrode plates and the two separators in the winding substrate.

In an optional implementation, the method further includes: determining real-time position information of an edge of the to-be-wound layer and an edge of the wound layer based on the actual number of pixels included in the distance between the edge of the inner side surface of the to-be-wound layer and the third reference line or the fourth reference line, the actual number of pixels included in the distance between the edge of the outer side surface of the wound layer and the third reference line or the fourth reference line, the third actual distance, and the fourth actual distance. The third actual distance is an actual distance corresponding to a single pixel that is determined based on the second reference distance and the third reference number of pixels. The fourth actual distance is an actual distance corresponding to a single pixel that is determined based on the second reference distance and the fourth reference number of pixels. The real-time position information of the edge of the inner side surface of the to-be-wound layer is determined based on the actual number of pixels included in the distance between the edge of the inner side surface of the to-be-wound layer and the third reference line or the fourth reference line and the third actual distance. The real-time position information of the edge of the outer side surface of the wound layer is determined based on the actual number of pixels included in the distance between the edge of the outer side surface of the wound layer and the third reference line or the fourth reference line and the fourth actual distance. In this way, positions of the edge of the inner side surface of the to-be-wound layer and the edge of the outer side surface of the wound layer are accurately detected, so as to subsequently provide effective data support for calibration of the winding substrate. This facilitates complete calibration at a time, and improves a success rate of winding the winding substrate.

In an optional implementation, in a thickness direction of the winding substrate, the winding substrate includes a first electrode plate, a first separator, a second electrode plate, and a second separator. The obtaining an actual number of pixels included in a distance between an edge of the outer side surface of the wound layer and the first reference line or the second reference line includes: obtaining, on the outer side surface of the wound layer, a first actual number of pixels included in a distance between an edge of one end of the first electrode plate and the first reference line or the second reference line; and obtaining a second actual number of pixels included in a distance between an edge of one end of the first separator and the first reference line or the second reference line. The obtaining an actual number of pixels included in a distance between an edge of the inner side surface of the to-be-wound layer and the first reference line or the second reference line includes: obtaining, on the inner side surface of the to-be-wound layer, a third actual number of pixels included in a distance between an edge of one end of the second electrode plate and the first reference line or the second reference line; and obtaining a fourth actual number of pixels included in a distance between an edge of one end of the second separator and the first reference line or the second reference line. The actual distance between the edge of the one end of the first electrode plate and the first reference line or the second reference line, the actual distance between the edge of the one end of the first separator and the first reference line or the second reference line, the actual distance between the edge of the one end of the second electrode plate and the third reference line or the fourth reference line, and the actual distance between the edge of the one end of the second separator and the third reference line or the fourth reference line are calculated based on the first actual number of pixels, the second actual number of pixels, the third actual number of pixels, and the fourth actual number of pixels, respectively. Further, a distance between the edges of the electrode plates and distances between the edges of the electrode plates and the separators are calculated. In this way, whether positions of the edges of the electrode plates and the separators are accurate is determined.

In an optional implementation, the obtaining an actual number of pixels included in a distance between the edge of the outer side surface of the wound layer and the third reference line or the fourth reference line includes: obtaining, on the outer side surface of the wound layer, a fifth actual number of pixels included in a distance between an edge of the other end of the first electrode plate and the third reference line or the fourth reference line; and obtaining a sixth actual number of pixels included in a distance between an edge of the other end of the first separator and the third reference line or the fourth reference line. The obtaining an actual number of pixels included in a distance between the edge of the inner side surface of the to-be-wound layer and the third reference line or the fourth reference line includes: obtaining, on the inner side surface of the to-be-wound layer, a seventh actual number of pixels included in a distance between an edge of the other end of the second electrode plate and the third reference line or the fourth reference line; and obtaining an eighth actual number of pixels included in a distance between an edge of the other end of the second separator and the third reference line or the fourth reference line. The actual distance between the edge of the other end of the first electrode plate and the first reference line or the second reference line, the actual distance between the edge of the other end of the first separator and the first reference line or the second reference line, the actual distance between the edge of the other end of the second electrode plate and the third reference line or the fourth reference line, and the actual distance between the edge of the other end of the second separator and the third reference line or the fourth reference line may be calculated based on the fifth actual number of pixels, the sixth actual number of pixels, the seventh actual number of pixels, and the eighth actual number of pixels in combination with the actual distance corresponding to a single pixel in each image that is obtained above. Further, a distance between the edges of the electrode plates and distances between the edges of the electrode plates and the separators are calculated. In this way, whether positions of the edges of the electrode plates and the separators are accurate is determined.

In an optional implementation, when the reference number of pixels included in the first reference distance includes the first reference number of pixels corresponding to the inner side surface of the to-be-wound layer and the second reference number of pixels corresponding to the outer side surface of the wound layer, the determining real-time position information of the edge of the winding substrate based on the actual number of pixels included in the distance between the edge of the winding substrate and the first reference line or the second reference line and the actual distance corresponding to a single pixel includes: determining real-time position information of the edge of the one end of the first electrode plate based on the first actual number of pixels and the first actual distance corresponding to a single pixel that is determined based on the first reference distance and the first reference number of pixels; determining real-time position information of the edge of the one end of the first separator based on the second actual number of pixels and the first actual distance; determining real-time position information of the edge of the one end of the second electrode plate based on the third actual number of pixels and the second actual distance corresponding to a single pixel that is determined based on the first reference distance and the second reference number of pixels; and determining real-time position information of the edge of the one end of the second separator based on the fourth actual number of pixels and the second actual distance. The real-time position information of the one end of the first electrode plate and the one end of the first separator and the real-time position information of the one end of the second electrode plate and the one end of the second separator are determined based on the first actual number of pixels as well as the second actual number of pixels and the first actual distance, and the third actual number of pixels as well as the fourth actual number of pixels and the second actual distance, respectively. Further, real-time position information of the two ends of the first electrode plate, the first separator, the second electrode plate, and the second separator may be compared with standard positions, so as to determine whether the positions of the first electrode plate, the first separator, the second electrode plate, and the second separator need to be calibrated. In this way, the success rate of winding the winding substrate is ensured.

In an optional implementation, the determining real-time position information of an edge of the to-be-wound layer and an edge of the wound layer based on the actual number of pixels included in the distance between the edge of the inner side surface of the to-be-wound layer and the third reference line or the fourth reference line, the actual number of pixels included in the distance between the edge of the outer side surface of the wound layer and the third reference line or the fourth reference line, the third actual distance, and the fourth actual distance includes: determining real-time position information of the edge of the other end of the first electrode plate based on the fifth actual number of pixels and the third actual distance; determining real-time position information of the edge of the other end of the first separator based on the sixth actual number of pixels and the third actual distance; determining real-time position information of the edge of the other end of the second electrode plate based on the seventh actual number of pixels and the fourth actual distance; and determining real-time position information of the edge of the other end of the second separator based on the eighth actual number of pixels and the fourth actual distance. The real-time position information of the two ends of the first electrode plate, the first separator, the second electrode plate, and the second separator is determined based on the real-time position information of the other end of the first electrode plate and the other end of the first separator and the real-time position information of the other end of the second electrode plate and the other end of the second separator, respectively. Further, the real-time position information of the two ends of the first electrode plate, the first separator, the second electrode plate, and the second separator may be compared with the standard positions, so as to determine whether the positions of the first electrode plate, the first separator, the second electrode plate, and the second separator need to be calibrated. In this way, the success rate of winding the winding substrate is ensured.

According to another aspect of the embodiments of the present application, there is provided a cell winding calibration apparatus, including: a first obtaining module configured to obtain a first reference distance between a first reference line and a second reference line, where the first reference line and the second reference line are parallel identification lines formed on a winding substrate, and the first reference distance remains unchanged in a cell winding process; a second obtaining module configured to obtain a reference number of pixels included in the first reference distance; a first determining module configured to determine, based on the first reference distance and the reference number of pixels included in the first reference distance, an actual distance corresponding to a single pixel; a third obtaining module configured to obtain an actual number of pixels included in a distance between an edge of the winding substrate and the first reference line or the second reference line; a second determining module configured to determine real-time position information of the edge of the winding substrate based on the actual number of pixels included in the distance between the edge of the winding substrate and the first reference line or the second reference line and the actual distance corresponding to a single pixel; and a calibration module configured to calibrate the winding substrate based on the real-time position information of the edge of the winding substrate.

According to another aspect of the embodiments of the present application, there is provided a cell winding calibration device, including: a winding unit, a beam emission unit, an image acquisition unit, a control unit, and a calibration unit. The winding unit is configured to wind a winding substrate. The beam emission unit is disposed on one side of the winding unit, and is configured to form a first reference line and a second reference line on the winding substrate. The first reference line and the second reference line are parallel identification lines. A distance between the first reference line and the second reference line is a first reference distance. The first reference distance remains unchanged in a cell winding process. The image acquisition unit is disposed on one side of the winding unit, and is configured to perform image acquisition on the winding substrate, and send an acquired image to the control unit. The control unit is configured to obtain, based on the image acquired by the image acquisition unit, a reference number of pixels included in the first reference distance, and determine, based on the first reference distance and the reference number of pixels included in the first reference distance, an actual distance corresponding to a single pixel. The control unit is further configured to obtain, based on the image acquired by the image acquisition unit, an actual number of pixels included in a distance between an edge of the winding substrate and the first reference line or the second reference line, determine real-time position information of the edge of the winding substrate based on the actual number of pixels included in the distance between the edge of the winding substrate and the first reference line or the second reference line and the actual distance corresponding to a single pixel, and send the real-time position information of the edge of the winding substrate to the calibration unit. The calibration unit is configured to calibrate the winding substrate based on the real-time position information.

According to the present application, the control unit determines, based on the first reference distance between the first reference line and the second reference line and the reference number of pixels included in the first reference distance, which are obtained from the image acquired by the image acquisition unit, the actual distance corresponding to a single pixel. The first reference line and the second reference line are parallel identification lines formed by the beam emission unit on the winding substrate, and the first reference distance remains unchanged in the cell winding process. Therefore, in the winding process, even though a thickness of the winding substrate increases, an object distance changes, and a resolution of an acquired image changes accordingly, the actual distance corresponding to a single pixel can still be accurately determined. The first reference line and the second reference line are parallel identification lines formed on the winding substrate, so that the first reference line and the second reference line are easier to recognize during imaging. In addition, to avoid difficulty in clearly recognizing a distance between edges of a separator and an electrode plate due to an image blur and an excessively short distance between the edges of the separator and the electrode plate, numbers of pixels included in distances between the edges of the separator as well as the electrode plate in the winding substrate and the first reference line or the second reference line are read and combined with the actual distance corresponding to a single pixel to accurately determine the real-time position information of the edge of the winding substrate, so as to accurately and effectively calibrate the edge of the winding substrate by using the calibration unit. In this way, a qualification rate of winding the winding substrate is ensured.

In an optional implementation, a minimum recognition distance of the image acquisition unit is less than or equal to the first reference distance. A purpose of setting the minimum recognition distance of the image acquisition unit to be less than or equal to the first reference distance is to accurately obtain the actual distance corresponding to a single pixel and avoid a failure or error, due to that the first reference distance in the image acquired by the image acquisition unit is excessively short, in obtaining the reference number of pixels included in the first reference distance.

In an optional implementation, the winding substrate includes a wound layer formed after a winding operation already performed and a to-be-wound layer on which a winding operation is to be performed. The beam emission unit includes a first linear beam emitter and a second linear beam emitter that are disposed side by side in a width direction of the winding substrate. The first linear beam emitter is configured to form the first reference line on an outer side surface of the wound layer and an inner side surface of the to-be-wound layer. The second linear beam emitter is configured to form the second reference line on the outer side surface of the wound layer and the inner side surface of the to-be-wound layer. The first linear beam emitter and the second linear beam emitter can more conveniently form the first reference line and the second reference line, respectively. In addition, in the present application, the first reference line and the second reference line are formed on both the outer side surface of the wound layer and the inner side surface of the to-be-wound layer, and image acquisition is performed on the outer side surface of the wound layer and the inner side surface of the to-be-wound layer at a time, to implement image acquisition and recognition of the edges of both electrode plates and both separators. The first reference line and the second reference line are located on the outer side surface of the wound layer and the inner side surface of the to-be-wound layer. This helps recognize the distance between the edge of the winding substrate and the first reference line or the second reference line, so as to determine the real-time position information of the edge of the winding substrate.

In an optional implementation, the image acquisition unit includes a first camera and a second camera that are disposed side by side in a direction perpendicular to a winding axis of the winding unit. The first camera is configured to perform image acquisition on the inner side surface of the to-be-wound layer. The second camera is configured to perform image acquisition on the outer side surface of the wound layer. The image acquisition unit includes the first camera and the second camera that are disposed side by side in the direction perpendicular to the winding axis of the winding unit to implement image acquisition on the inner side surface of the to-be-wound layer and the outer side surface of the wound layer separately, so as to obtain an image of the inner side surface of the to-be-wound layer and an image of the outer side surface of the wound layer, respectively. A first reference number of pixels and a second reference number of pixels included in the first reference distance are obtained from the image of the inner side surface of the to-be-wound layer and the image of the outer side surface of the wound layer, respectively. A first actual distance and a second actual distance that correspond to a single pixel in the two images are determined based on the first reference distance, the first reference number of pixels, and the second reference number of pixels, so that blurring of a part of surface during imaging of the winding substrate due to a small depth of field of the image acquisition unit can be effectively avoided. Image acquisition is performed on the inner side surface of the to-be-wound layer and the outer side surface of the wound layer separately, so that high resolutions are ensured in imaging of both the inner side surface of the to-be-wound layer and the outer side surface of the wound layer, and the images are sharp. This helps improve precision of detecting a position of the edge of the winding substrate.

In an optional implementation, the beam emission unit further includes a third linear beam emitter and a fourth linear beam emitter that are disposed side by side. The third linear beam emitter as well as the fourth linear beam emitter and the first linear beam emitter as well as the second linear beam emitter are aligned with two ends of the winding substrate in the width direction, respectively. The first linear beam emitter is configured to form the first reference line at one end of the outer side surface of the wound layer and one end of the inner side surface of the to-be-wound layer. The second linear beam emitter is configured to form the second reference line at the one end of the outer side surface of the wound layer and the one end of the inner side surface of the to-be-wound layer. The third linear beam emitter is configured to form a third reference line at the other end of the outer side surface of the wound layer and the other end of the inner side surface of the to-be-wound layer. The fourth linear beam emitter is configured to form a fourth reference line at the other end of the outer side surface of the wound layer and the other end of the inner side surface of the to-be-wound layer. The third reference line and the fourth reference line are parallel identification lines. A distance between the third reference line and the fourth reference line is a second reference distance. The second reference distance remains unchanged in the cell winding process. The first reference line and the second reference line are formed on a surface of one end of the winding substrate, and the third reference line and the fourth reference line are formed at the other end. In this way, it is ensured that there are two reference lines in each of images of edges of the two ends of the winding substrate when the image of the edges needs to be obtained, so that detection accuracy can be ensured. In addition, a framing imaging area of the image acquisition unit can be reduced, the acquired image can be optimized, and the detection precision can be improved.

In an optional implementation, the image acquisition unit further includes a third camera and a fourth camera that are disposed side by side in the direction perpendicular to the winding axis of the winding unit. The third camera as well as the fourth camera and the first camera as well as the second camera are aligned with the two ends of the winding substrate in the width direction, respectively. The first camera is configured to perform image acquisition on an edge of the one end of the inner side surface of the to-be-wound layer. The second camera is configured to perform image acquisition on an edge of the one end of the outer side surface of the wound layer. The third camera is configured to perform image acquisition on an edge of the other end of the inner side surface of the to-be-wound layer. The fourth camera is configured to perform image acquisition on an edge of the other end of the outer side surface of the wound layer. The image acquisition unit includes the first camera, the second camera, the third camera, and the fourth camera, and the third camera as well as the fourth camera and the first camera as well as the second camera are respectively aligned with the two ends of the winding substrate, so that a problem that an image including both ends of the winding substrate cannot be acquired due to a limited image acquisition range is solved, and blurring of a part of surface during imaging of the winding substrate due to a small depth of field of the image acquisition unit can be effectively avoided. Image acquisition is performed on the inner side surface of the to-be-wound layer, the outer side surface of the wound layer, and each end separately, so that high resolutions are ensured in imaging of the edges of the two ends of both the inner side surface of the to-be-wound layer and the outer side surface of the wound layer, and images are sharp. This helps improve precision of detecting positions of edges of two ends of the winding substrate.

In an optional implementation, the first camera is configured to perform, through the inner side surface of the to-be-wound layer, image acquisition on an edge of one end of a first electrode plate and an edge of one end of a first separator of the winding substrate. The second camera is configured to perform, through the outer side surface of the wound layer, image acquisition on an edge of one end of a second electrode plate and an edge of one end of a second separator of the winding substrate. The third camera is configured to perform, through the inner side surface of the to-be-wound layer, image acquisition on an edge of the other end of the first electrode plate and an edge of the other end of the first separator of the winding substrate. The fourth camera is configured to perform, through the outer side surface of the wound layer, image acquisition on an edge of the other end of the second electrode plate and an edge of the other end of the second separator of the winding substrate. Image acquisition is performed on the edges of the two ends of the first electrode plate, the first separator, the second electrode plate, and the second separator respectively by using the four cameras, to calculate an actual distance between the edge of the first electrode plate and the first reference line or the second reference line, an actual distance between the edge of the first separator and the first reference line or the second reference line, an actual distance between the second electrode plate and the third reference line or the fourth reference line, and an actual distance between the second separator and the third reference line or the fourth reference line, respectively. Further, a distance between the edges of the electrode plates and distances between the edges of the electrode plates and the separators are calculated. In this way, whether positions of the edges of the electrode plates and the separators are accurate is determined.

In an optional implementation, the beam emission unit further includes an emitter guide rail, a first emitter slider, and a second emitter slider. The emitter guide rail is parallel to the winding axis of the winding unit. The first emitter slider and the second emitter slider are disposed on the emitter guide rail in a sliding manner. Both the first linear beam emitter and the second linear beam emitter are fixed on the first emitter slider. Both the third linear beam emitter and the fourth linear beam emitter are fixed on the second emitter slider. The beam emission unit includes the emitter guide rail, the first emitter slider, and the second emitter slider. The emitter guide rail is parallel to the winding axis of the winding unit. The first emitter slider and the second emitter slider are disposed on the emitter guide rail in the sliding manner. Both the first linear beam emitter and the second linear beam emitter are fixed on the first emitter slider. Both the third linear beam emitter and the fourth linear beam emitter are fixed on the second emitter slider. Therefore, the first emitter slider or the second emitter slider can slide on the emitter guide rail to adjust a distance between the first reference line as well as the second reference line and the third reference line as well as the fourth reference line. In this way, the distance between the reference lines at the two ends can be correspondingly adjusted based on winding substrates of different widths. Therefore, compatibility of the device is improved.

In an optional implementation, the image acquisition unit further includes a first camera guide rail, a second camera guide rail, a first camera slider, a second camera slider, a third camera slider, and a fourth camera slider. Both the first camera guide rail and the second camera guide rail are parallel to the winding axis of the winding unit. The first camera, the second camera, the third camera, and the fourth camera are fixed on the first camera slider, the second camera slider, the third camera slider, and the fourth camera slider, respectively. The first camera slider and the third camera slider are disposed on the first camera guide rail in the sliding manner. The second camera slider and the fourth camera slider are disposed on the second camera guide rail in the sliding manner. The image acquisition unit includes the first camera guide rail, the second camera guide rail, the first camera slider, the second camera slider, the third camera slider, and the fourth camera slider. Both the first camera guide rail and the second camera guide rail are parallel to the winding axis of the winding unit. The first camera, the second camera, the third camera, and the fourth camera are fixed on the first camera slider, the second camera slider, the third camera slider, and the fourth camera slider, respectively. The first camera slider and the third camera slider are disposed on the first camera guide rail in the sliding manner. The second camera slider and the fourth camera slider are disposed on the second camera guide rail in the sliding manner. A distance between the first camera guide rail and the second camera guide rail may be adjusted to adjust a distance between the first camera and the second camera and a distance between the third camera and the fourth camera. The first camera slider or the third camera slider slides on the first camera guide rail to adjust a distance between the first camera and the third camera. The second camera slider or the fourth camera slider slides on the second camera guide rail to adjust a distance between the second camera and the fourth camera. In this way, a position of an image acquisition region can be correspondingly adjusted based on winding substrates of different widths and different thicknesses. Therefore, the compatibility of the cell winding calibration device is improved.

According to another aspect of the embodiments of the present application, there is provided an electronic device, including: at least one processor; and a memory communicatively connected to the at least one processor. The memory stores instructions executable by the at least one processor. The instructions, when executed by the at least one processor, cause the at least one processor to perform the cell winding calibration method in the above embodiment.

According to another aspect of the embodiments of the present application, there is provided a cell winding system, including the cell winding calibration device in any one of the above embodiments.

According to another aspect of the embodiments of the present application, there is provided a computer-readable storage medium having a computer program stored therein. The computer program, when executed by a processor, implements the cell winding calibration method in any one of the above embodiments.

According to another aspect of the embodiments of the present application, there is provided a computer program product, including a computer program. The computer program, when executed by a processor, implements the cell winding calibration method in any one of the above embodiments.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of some implementations. Accompanying drawings are merely for the purpose of illustrating some implementations and are not to be construed as limiting the present application. Moreover, like components are denoted by like reference signs throughout the accompanying drawings.

In order to more clearly illustrate the technical solutions of the embodiments of the present application, the accompanying drawings required in the embodiments of the present application will be briefly described below. Obviously, the accompanying drawings described below are merely some embodiments of the present application, and for those of ordinary skill in the art, other accompanying drawings can be obtained from these accompanying drawings without making creative efforts.

FIG. 6 is a schematic flowchart of a cell winding calibration method according to an embodiment of the present application;

FIG. 7 is a schematic flowchart of a cell winding calibration method according to an embodiment of the present application;

FIG. 9 is a schematic flowchart of a cell winding calibration method according to an embodiment of the present application;

FIG. 12 is a schematic flowchart of a cell winding calibration method according to an embodiment of the present application;

FIG. 13 is a schematic flowchart of a cell winding calibration method according to an embodiment of the present application;

FIG. 14 is a schematic flowchart of a cell winding calibration method according to an embodiment of the present application;

FIG. 15 is a schematic flowchart of a cell winding calibration method according to an embodiment of the present application;

FIG. 16 is a schematic flowchart of a cell winding calibration method according to an embodiment of the present application;

FIG. 17 is a schematic flowchart of a cell winding calibration method according to an embodiment of the present application;

FIG. 18 is a schematic flowchart of a cell winding calibration method according to an embodiment of the present application;

FIG. 19a is a schematic diagram of an image acquired by a first camera in a cell winding calibration method according to an embodiment of the present application;

FIG. 19b is a schematic diagram of an image acquired by a second camera in a cell winding calibration method according to an embodiment of the present application;

FIG. 19c is a schematic diagram of an image acquired by a third camera in a cell winding calibration method according to an embodiment of the present application;

FIG. 19d is a schematic diagram of an image acquired by a fourth camera in a cell winding calibration method according to an embodiment of the present application;

FIG. 20 is a schematic flowchart of a cell winding calibration method according to an embodiment of the present application;

FIG. 21 is a schematic flowchart of a cell winding calibration method according to an embodiment of the present application.

DETAILED DESCRIPTION OF EMBODIMENTS

Figure 1:
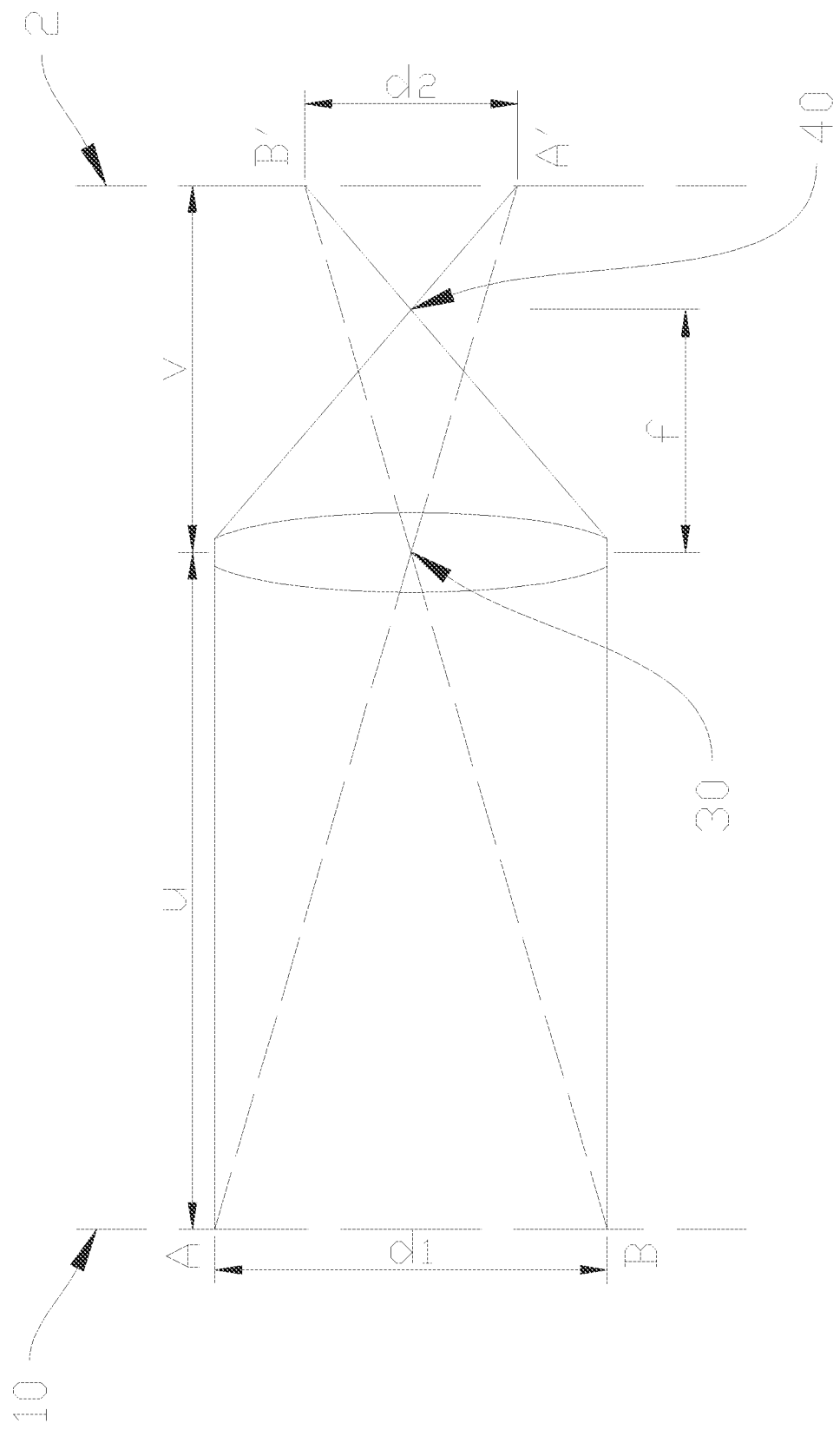
FIG. 1 is a schematic diagram of an imaging ranging principle according to an embodiment of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

It should be noted that, unless otherwise specified, the technical terms or scientific terms used in the embodiments of the present application shall have ordinary meanings understood by persons skilled in the art to which the embodiments of the present application belong.

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In addition, the technical terms "first", "second", and the like are used for descriptive purposes only, and cannot be construed as indicating or implying relative importance or implicitly indicating the number of technical features indicated. In the description of the embodiments of the present application, the phrase "a plurality of" means two or more, unless otherwise explicitly and specifically defined.

In the description of the embodiments of the present application, unless otherwise explicitly specified and defined, the technical terms such as "mount", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be internal communication between two elements or interaction between the two elements. For those of ordinary skill in the art, the specific meanings of the above terms in the embodiments of the present application can be understood according to specific situations.

In the description of the embodiments of the present application, unless otherwise explicitly specified and defined, a first feature being "above" or "below" a second feature may be direct contact between the first feature and the second feature, or indirect contact between the first feature and the second feature by means of an intermediate medium. Moreover, the first feature being "on", "above", and "over" the second feature may be the first feature being directly above or obliquely above the second feature, or simply mean that the first feature is at a higher level than the second feature. That the first feature is "under", "below", and "underneath" the second feature may be that the first feature is right below or obliquely below the second feature, or only means that the level height of the first feature is less than that of the second feature.

In some cases, in a winding process of a cell, a focal length of an image acquisition apparatus is first set. The image acquisition apparatus may be, for example, a camera or an image sensor. A proportional relationship between an object plane and an image plane is obtained, to measure a distance between edges of an electrode plate and a separator in the wound cell.

In some embodiments, FIG. 1 is a schematic diagram of an imaging ranging principle according to an embodiment of the present application. As shown in FIG. 1, a distance between a point A and a point B on an object plane 10 is $d_1$, and $d_1$ is an unknown quantity that needs to be obtained through calculation.

The point A and the point B on the object plane 10 correspond to a point A' and a point B' on an imaging plane 20, respectively. A distance between the point A' and the point B' on the imaging plane 20 is $d_2$. Based on a number of pixels included between the point A' and the point B' in an obtained image and a resolution of the obtained image, through a conversion formula between a pixel, a resolution, and an image size:

$$\frac{\text{Pixel}}{\text{Resolution}} = \text{Image size}$$

that is, $$d_2 = \frac{\text{Number of pixels included between } A' \text{ and } B'}{\text{Resolution of the obtained image}}$$

a value of $d_2$ is obtained.

u is an object distance, that is, a distance between the object plane 10 from which the image is acquired and an optical center 30 of a lens of the image acquisition apparatus. u may be measured when positions of an object whose image is acquired and the image acquisition apparatus are set.

f is the focal length, that is, a distance between a focal point 40 and the optical center 30 of the lens. f is a known quantity calibrated before the image acquisition apparatus performs acquisition.

v is an image distance, that is, a distance between the optical center 30 of the lens and the imaging plane 20. Through an imaging formula:

$$\frac{1}{f} = \frac{1}{u} + \frac{1}{v}$$

a value of v may be obtained.

Hereto, $d_2$, the object distance u, and the image distance v are known, and based on an imaging proportional relationship:

$$\frac{d_1}{d_2} = \frac{u}{v}$$

$$d_1 = \frac{u}{v} \cdot d_2$$

is obtained, so as to obtain the distance between the point A and the point B in the acquired object, to measure the distance between the edges of the electrode plate and the separator in the wound cell.

In the above ranging manner, as a number of winding times increases, a thickness of the cell correspondingly increases, that is, the object distance u decreases. However, the focal length is fixed, and if an increase in the thickness of the cell is large, the image may be blurred. As a result, a short distance between the edges of the separator and the electrode plate and image blurring affect measurement accuracy.

Figure 2:
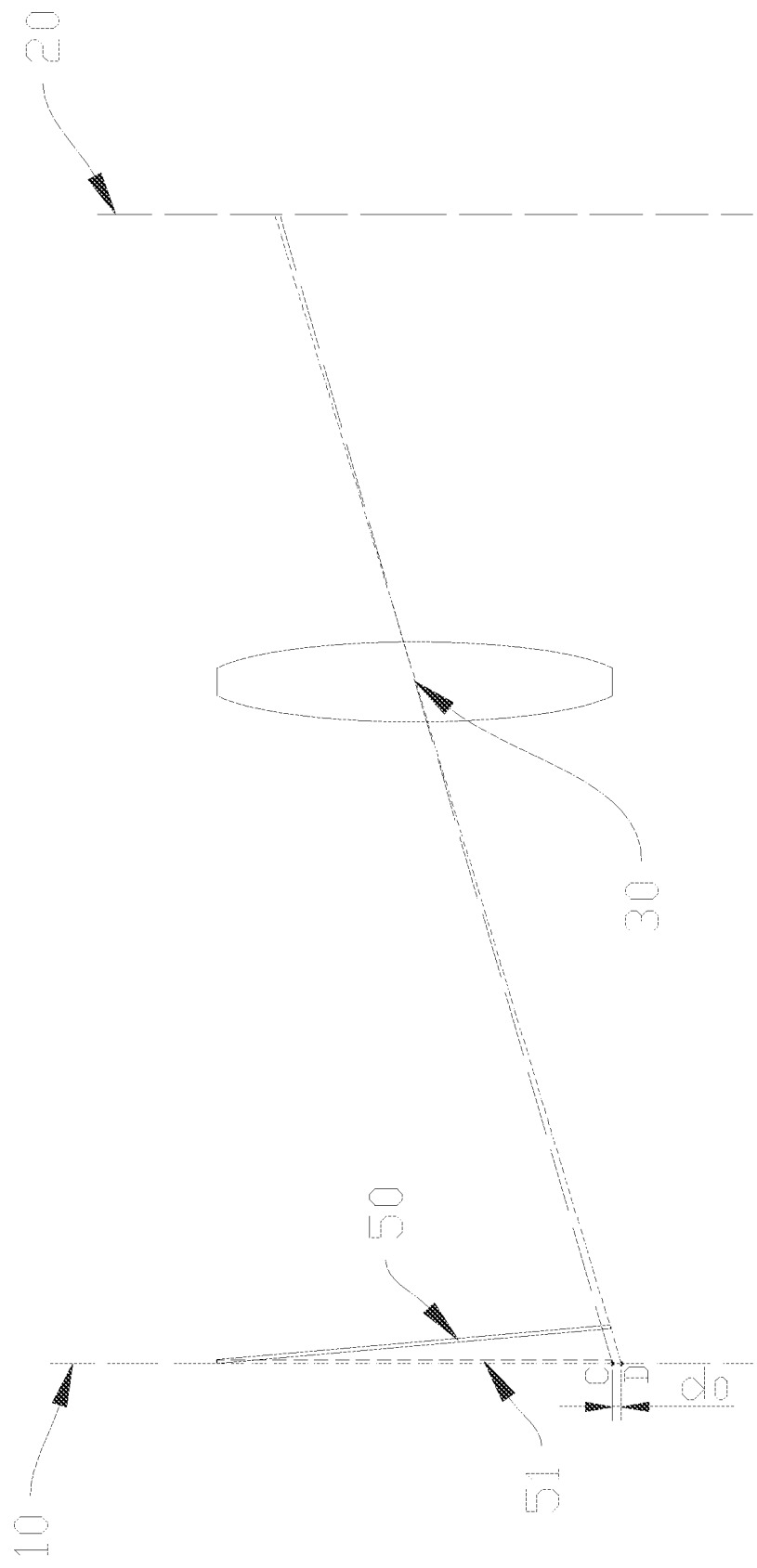
FIG. 2 is a schematic diagram of an imaging ranging principle when a separator is inclined according to an embodiment of the present application.

When the separator or the electrode plate of the wound cell is inclined during image acquisition, there may be a ranging error. FIG. 2 is a schematic diagram of an imaging ranging principle when the separator is inclined according to an embodiment of the present application. FIG. 2 is a diagram of a ranging principle of the image acquisition apparatus when a separator 50 is inclined. In this figure, a solid part at the object plane 10 indicates that there is the inclined separator 50, and a dashed part at the object plane 10 indicates a position 51 at which the separator 50 is upright after being fitted to the object plane 10.

As shown in FIG. 2, a correct image acquisition point for an edge of the separator 50 is a point C on the object plane 10. However, the separator 50 is inclined. Therefore, an actual image acquisition point is a point D on the object plane 10. As a result, there is an error in acquisition on the edge of the separator 50, bringing an error in subsequent measurement of a distance between the separator 50 and the electrode plate. If the electrode plate is not inclined, a ranging error is a distance do between the point C and the point D.

When the separator or the electrode plate is inclined, due to the ranging error, it is likely to eliminate a qualified cell as an unqualified cell and determine an unqualified cell as a qualified cell, bringing over-elimination and missing elimination risks.

In view of the above problem, the applicant found in research that, through formation of a first reference line and a second reference line that are parallel to each other on a winding substrate of the cell in a manner of keeping a first reference distance between the first reference line and the second reference line unchanged, and obtaining of a number of pixels included in the first reference distance, and determination of an actual distance corresponding to a single pixel, real-time position information of an edge of the winding substrate may be accurately and effectively determined, and calibration may be performed based on the real-time position information.

As the number of winding times increases, a thickness of the winding substrate correspondingly increases, and the image is blurred. However, the first reference line and the second reference line are identification lines formed on the winding substrate, so that the first reference line and the second reference line are easier to recognize during imaging. A distance between the edge of the winding substrate and the first reference line or the second reference line is longer, so that pixels are easier to read and recognize during imaging. The first reference distance is fixed, so that it can be effectively ensured that the measured actual distance corresponding to a single pixel is accurate, and the real-time position information of the edge of the winding substrate is further accurately determined for calibration.

When the winding substrate is inclined, since the first reference line and the second reference line are formed on a surface of the winding substrate, the first reference line and the second reference line may be inclined with the winding substrate. In this case, the number of pixels included in the distance between the edge of the winding substrate and the first reference line or the second reference line may be measured to accurately determine the real-time position information of the edge of the winding substrate and perform calibration.

Figure 3:
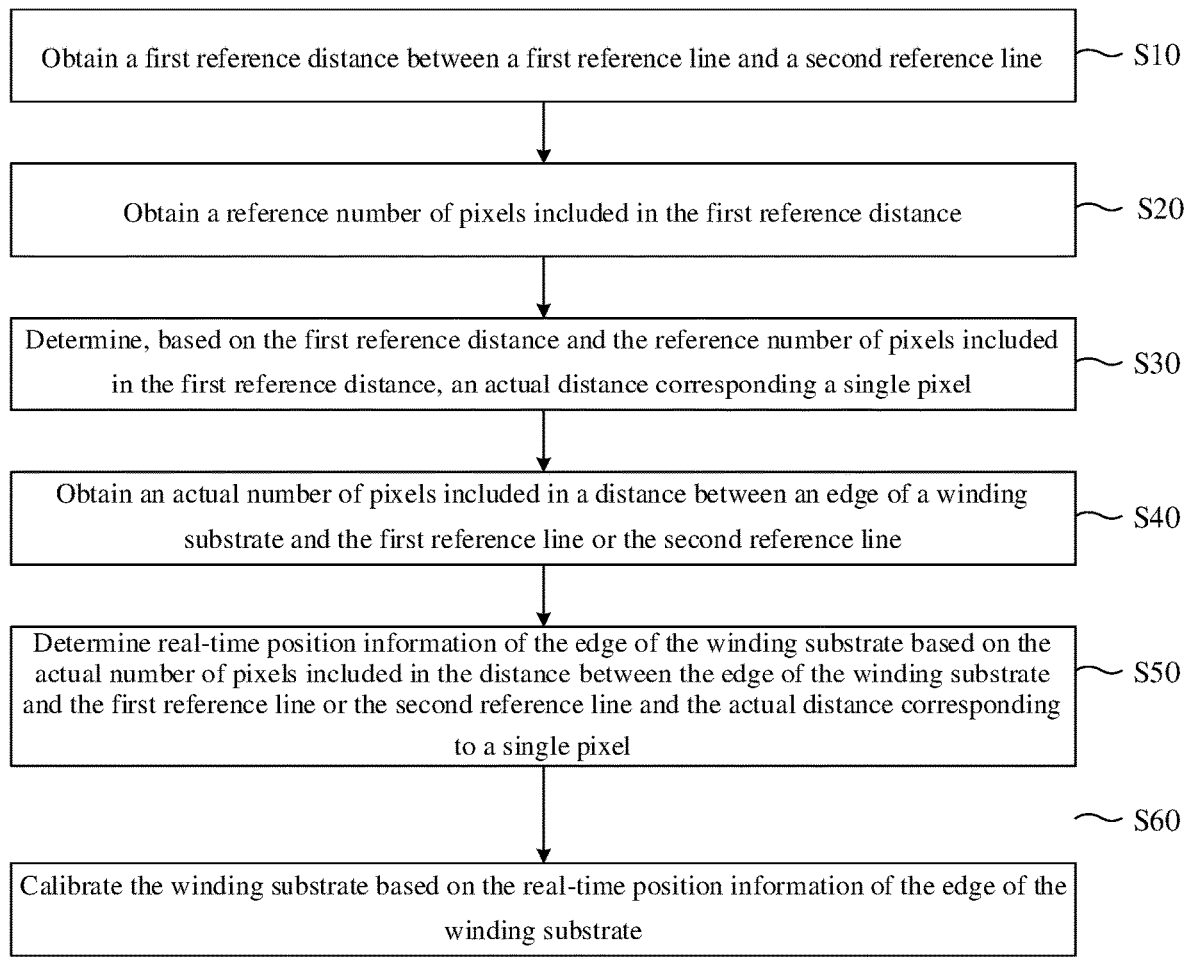
FIG. 3 is a schematic flowchart of a cell winding calibration method according to an embodiment of the present application.

FIG. 3 is a schematic flowchart of a cell winding calibration method according to an embodiment of the present application. The cell winding calibration method includes the following steps.

S10: Obtain a first reference distance between a first reference line and a second reference line.

The first reference line and the second reference line are parallel identification lines formed on a winding substrate. The first reference distance remains unchanged in a cell winding process.

In some embodiments, a light emission unit may be aligned with the winding substrate, so as to form two parallel identification lines on the winding substrate.

S20: Obtain a reference number of pixels included in the first reference distance.

In some embodiments, image acquisition may be performed on the winding substrate by using an image acquisition unit, for example, an ordinary camera or a linear array camera, and the reference number of pixels included in the first reference distance in an acquired image, that is, a number of pixel blocks included in the distance between the first reference line and the second reference line in the acquired image, is obtained by using the control unit.

S30: Determine, based on the first reference distance and the reference number of pixels included in the first reference distance, an actual distance corresponding to a single pixel.

In some embodiments, the first reference distance/the reference number of pixels included in the first reference distance=the actual distance corresponding to a single pixel.

S40: Obtain an actual number of pixels included in a distance between an edge of the winding substrate and the first reference line or the second reference line.

Similarly, after image acquisition is performed on the winding substrate by using the image acquisition unit, a number of pixel blocks included in the distance between the edge of the winding substrate and the first reference line or the second reference line in the acquired image is obtained by using the control unit. In some embodiments, the number of pixel blocks may be a number of pixel blocks included in a distance between an edge of a separator and the first reference line or the second reference line, or may be a number of pixel blocks included in a distance between an edge of an electrode plate and the first reference line or the second reference line.

S50: Determine real-time position information of the edge of the winding substrate based on the actual number of pixels included in the distance between the edge of the winding substrate and the first reference line or the second reference line and the actual distance corresponding to a single pixel.

The control unit determines an actual distance between the edge of the winding substrate and the first reference line or the second reference line based on the obtained actual number of pixels and the actual distance corresponding to a single pixel, so as to determine the real-time position information of the edge of the winding substrate. In some embodiments, the actual number of pixels×the actual distance corresponding to a single pixel=the actual distance between the edge of the winding substrate and the first reference line or the second reference line.

S60: Calibrate the winding substrate based on the real-time position information of the edge of the winding substrate.

In some embodiments, the control unit may compare the actual distance between the edge of the winding substrate and the first reference line or the second reference line with a theoretical distance, and then control a calibration unit, for example, a manipulator, to adjust and calibrate a position of the edge of the winding substrate.

Figure 4:
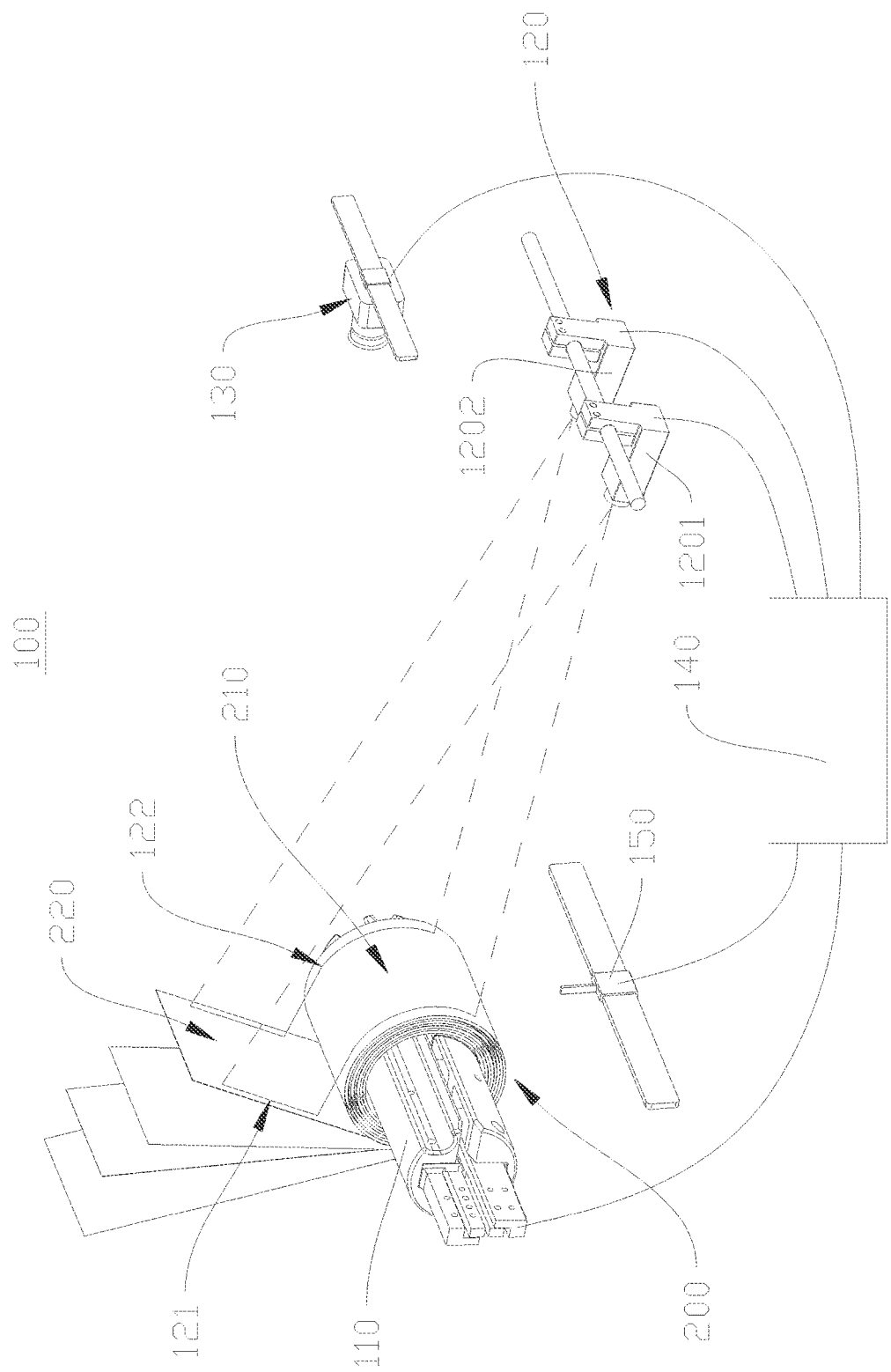
FIG. 4 is a schematic diagram of a structure of a cell winding calibration device according to an embodiment of the present application.

FIG. 4 is a schematic diagram of a structure of a cell winding calibration device according to an embodiment of the present application. The cell winding calibration device 100 includes a winding unit 110, a beam emission unit 120, an image acquisition unit 130, a control unit 140, and a calibration unit 150. The winding unit 110 is configured to wind a winding substrate 200. The beam emission unit 120 is configured to form a first reference line 121 and a second reference line 122 on the winding substrate 200. The image acquisition unit 130 is configured to perform image acquisition on the winding substrate 200. The control unit 140 is configured to analyze and detect obtained image data to determine real-time position information of an edge of the winding substrate 200, and control, based on the real-time position information, the calibration unit 150 to calibrate the winding substrate 200 or the winding unit 110 to wind the winding substrate 200.

It should be noted that in a winding process of the winding substrate 200, the above steps may be performed on each layer. When the real-time position information of the edge of the winding substrate 200 is correct, the control unit 140 controls the winding unit 110 to wind a next layer of winding substrate 200, and the above steps are repeated. When the real-time position information of the edge of the winding substrate 200 is incorrect, the control unit 140 controls the calibration unit 150 to calibrate the winding substrate 200, then the above steps are performed again on the winding substrate 200, and when the real-time position information is correct after the calibration, a next layer is wound.

According to the present application, the actual distance corresponding to a single pixel is determined based on the obtained first reference distance between the first reference line and the second reference line and the reference number of pixels included in the first reference distance. The first reference line and the second reference line are parallel identification lines formed on the winding substrate, and the first reference distance remains unchanged in the cell winding process. Therefore, in the winding process, even though a thickness of the winding substrate increases, an object distance changes, and a resolution of an acquired image changes accordingly, the actual distance corresponding to a single pixel can still be accurately determined. The first reference line and the second reference line are parallel identification lines formed on the winding substrate, so that the first reference line and the second reference line are easier to recognize during imaging. In addition, to avoid difficulty in clearly recognizing a distance between the edges of the separator and the electrode plate due to an image blur and an excessively short distance between the edges of the separator and the electrode plate, numbers of pixels included in distances between the edges of the separator as well as the electrode plate in the winding substrate and the first reference line or the second reference line are read and combined with the actual distance corresponding to a single pixel to accurately determine the real-time position information of the edge of the winding substrate, so as to accurately and effectively calibrate the edge of the winding substrate. In this way, a qualification rate of winding the winding substrate is ensured.

Figure 5:
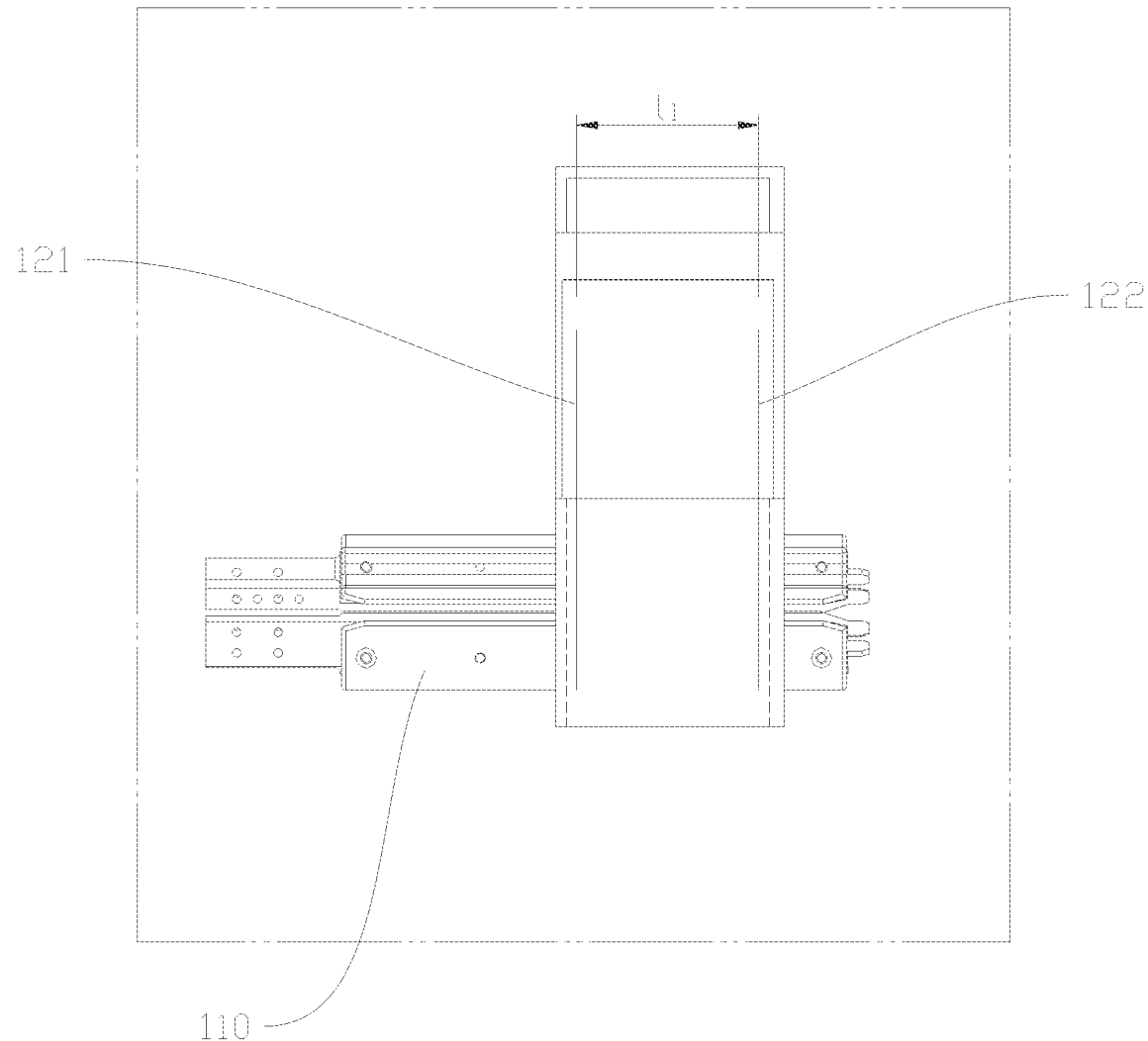
FIG. 5 is a schematic diagram of an image acquired in a cell winding calibration method according to an embodiment of the present application.

FIG. 5 is a schematic diagram of the image acquired in the cell winding calibration method according to an embodiment of the present application. According to some embodiments of the present application, the reference number of pixels included in the first reference distance is at least one.

That the reference number of pixels included in the first reference distance 11 is at least one means that in the image of the winding substrate acquired by the image acquisition unit, the distance 11 between the first reference line and the second reference line includes at least one pixel block, for a purpose of accurately obtaining the actual distance corresponding to a single pixel and avoiding a failure or error, due to that the first reference distance in the image is excessively short, in obtaining the reference number of pixels included in the first reference distance.

In an implementation of this embodiment of the present application, the first reference line 121 and the second reference line 122 are parallel identification lines formed on two opposite surfaces of the winding substrate. Disposing on the two opposite surfaces of the winding substrate indicates that the first reference line 121 or the second reference line 122 may be first recognized from the two opposite surfaces of the winding substrate, so that the real-time position information of the edge of the winding substrate can be more conveniently determined.

Referring to FIG. 4 again, according to some embodiments of the present application, the winding substrate 200 includes a wound layer 210 formed after a winding operation already performed and a to-be-wound layer 220 on which a winding operation is to be performed. The first reference line 121 and the second reference line 122 are parallel identification lines formed on an outer side surface of the wound layer 210 and an inner side surface of the to-be-wound layer 220.

The winding substrate 200 includes a positive electrode plate, a first separator, a negative electrode plate, and a second separator. Surface areas of the separators are larger than those of the positive electrode plate and the negative electrode plate, so that the separators can completely isolate the positive electrode plate from the negative electrode plate, to avoid a risk of a short circuit caused by contact between the electrode plates. In general, the separator is transparent to some extent, but the electrode plate is not transparent. Therefore, considering that when image acquisition is performed from one side of the winding substrate 200, edges of only one electrode plate and only one separator can be seen, and edges of the electrode plate and the separator that are away from the image acquisition unit 130 cannot be acquired, in the present application, the first reference line 121 and the second reference line 122 are formed on both the outer side surface of the wound layer 210 and the inner side surface of the to-be-wound layer 220, and image acquisition is performed on the outer side surface of the wound layer 210 and the inner side surface of the to-be-wound layer 220 at a time, to implement image acquisition and recognition of the edges of both electrode plates and both separators.

It should be noted that the winding substrate 200 has a circular surface, so that distances between the first reference line 121 as well as the second reference line 122 at different positions on the surface and the image acquisition unit 130 are unequal. In this case, distances between the first reference line 121 as well as the second reference line 122 and a farthest position and a closest position of the image acquisition unit 130 need to be less than a depth of field of the image acquisition unit 130, to ensure sharpness of the entire surface of the winding substrate 200 in the image acquired by the image acquisition unit 130. The depth of field refers to a range of distance between the front and back of a shot object that is measured to obtain a sharp image in front of a camera lens or another imaging device. An aperture, the lens, and a distance between a focal plane and the shot object are important factors that affect the depth of field.

In some embodiments, to improve ranging precision, the image acquisition unit 130 may be a linear array camera. The linear array camera is a camera using a linear array image sensor. The linear array image sensor mainly includes a CCD. The CCD is abbreviated from charge coupled device, can convert light into an electric charge and store and transfer the electric charge, or discharge a stored electric charge to change a voltage, and thus is an ideal CCD camera component. A CCD camera including the CCD features a small size and a light weight, no influence from a magnetic field, and resistance to vibration and impact, and thus is widely used.

A typical application field of the linear array camera is detection of a continuous material, for example, metal, plastic, paper, or a fiber. An object to be detected usually moves at a constant speed. The object is continuously scanned line by line by one or more cameras, so as to uniformly detect an entire surface of the object. An image of the object may be processed line by line, or an area array image including a plurality of lines is processed. The linear array camera is very suitable for a measurement scenario, and this is because a high resolution of the sensor capable of accurately measuring micrometers. As the name implies, the linear array camera is "linear". Such a camera is usually used in only two cases. In a first case, a measured field of view is strip-like, and the camera is mostly used for detection on a roller. In a second case, an excessively large field of view or extremely high precision is required.

FIG. 6 is a schematic flowchart of the cell winding calibration method according to an embodiment of the present application. According to some embodiments of the present application, step S20 includes the following steps.

S21: Obtain, on an inner side surface of the to-be-wound layer, a first reference number of pixels included in the first reference distance.

S22: Obtain, on an outer side surface of the wound layer away from a winding axis, a second reference number of pixels included in the first reference distance.

In some embodiments, the inner side surface of the to-be-wound layer and the outer side surface of the wound layer correspond to the two opposite surfaces of the winding substrate, respectively.

FIG. 7 is a schematic flowchart of the cell winding calibration method according to an embodiment of the present application. According to some embodiments of the present application, step S30 includes the following steps.

S31: Determine, based on the first reference distance and the first reference number of pixels, a first actual distance corresponding to a single pixel.

S32: Determine, based on the first reference distance and the second reference number of pixels, a second actual distance corresponding to a single pixel.

Figure 8:
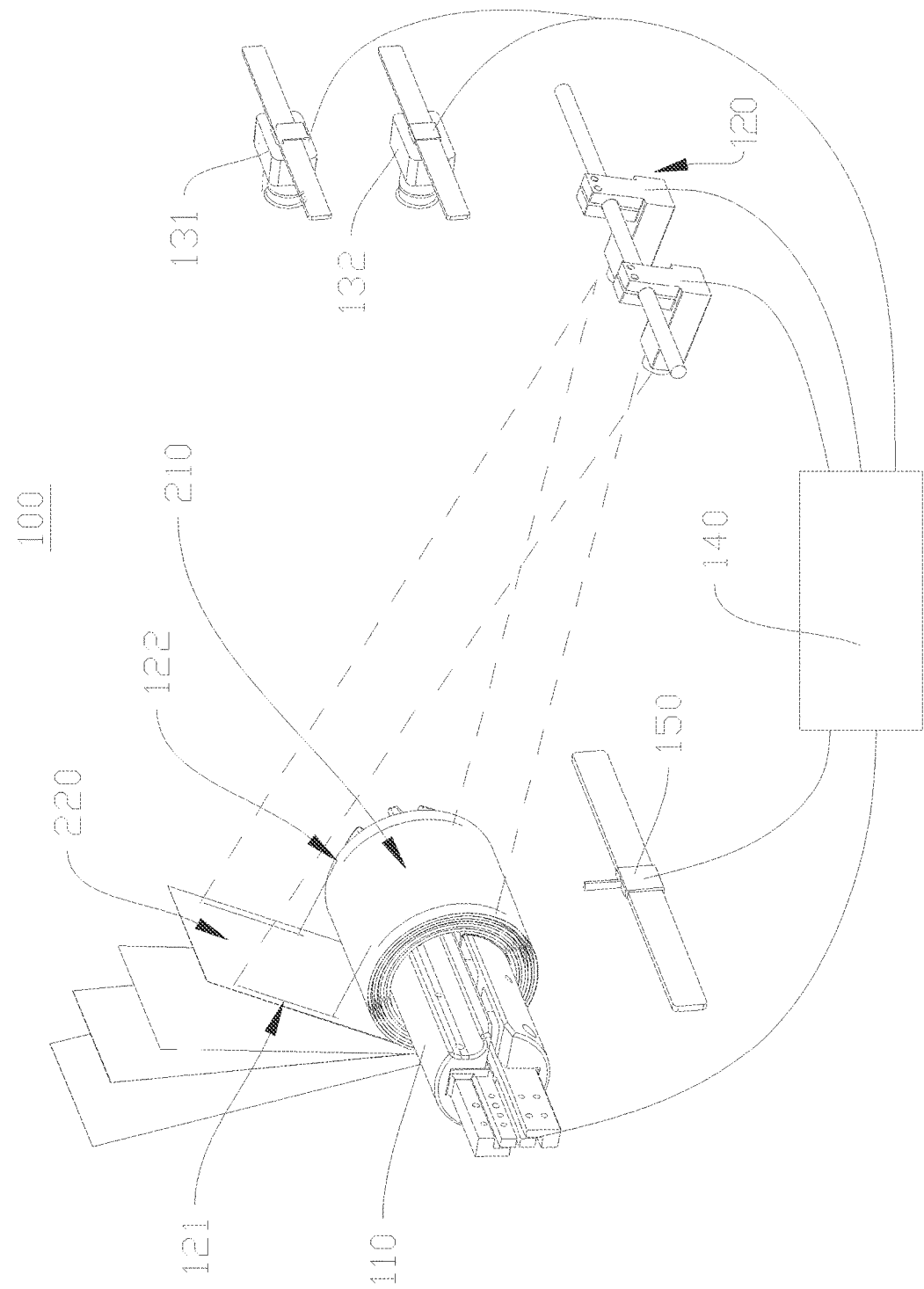
FIG. 8 is a schematic diagram of a structure of a cell winding calibration device according to another embodiment of the present application.

In some embodiments, FIG. 8 is a schematic diagram of the structure of the cell winding calibration device according to another embodiment of the present application. The image acquisition unit 130 includes two cameras in upper and lower positions. One camera is configured to perform image acquisition on the inner side surface of the to-be-wound layer 220. The other camera is configured to perform image acquisition on the outer side surface of the wound layer 210.

Image acquisition is performed on the inner side surface of the to-be-wound layer and the outer side surface of the wound layer separately, so as to obtain an image of the inner side surface of the to-be-wound layer and an image of the outer side surface of the wound layer, respectively. The first reference number of pixels and the second reference number of pixels included in the first reference distance are obtained from the image of the inner side surface of the to-be-wound layer and the image of the outer side surface of the wound layer, respectively. A first actual distance and a second actual distance that correspond to a single pixel in the two images are determined based on the first reference distance, the first reference number of pixels, and the second reference number of pixels, so that blurring of a part of surface during imaging of the winding substrate due to a small depth of field of the image acquisition unit can be effectively avoided. Image acquisition is performed on the inner side surface of the to-be-wound layer and the outer side surface of the wound layer separately, so that high resolutions are ensured in imaging of both the inner side surface of the to-be-wound layer and the outer side surface of the wound layer, and the images are sharp. This helps improve precision of detecting the position of the edge of the winding substrate.

FIG. 9 is a schematic flowchart of the cell winding calibration method according to an embodiment of the present application. According to some embodiments of the present application, step S40 includes the following steps.

S41: Obtain an actual number of pixels included in a distance between an edge of the outer side surface of the wound layer and the first reference line or the second reference line.

S42: Obtain an actual number of pixels included in a distance between an edge of the inner side surface of the to-be-wound layer and the first reference line or the second reference line.

In some embodiments, the edge of the winding substrate is an edge of one side in a width direction of the winding substrate.

In some embodiments, after the two cameras in upper and lower positions respectively perform image acquisition on the outer side surface of the wound layer and the inner side surface of the to-be-wound layer, the control unit first obtains an actual number of pixels included in the distance between the edge of the inner side surface of the to-be-wound layer and the first reference line or the second reference line in one acquired image, so as to obtain an actual number of pixels included in a distance between one electrode plate as well as one separator in the winding substrate and the first reference line or the second reference line and further determine position information of edges of the electrode plate and the separator based on the first actual distance corresponding to a single pixel in this image. Then, the control unit obtains an actual number of pixels included in the distance between the edge of the outer side surface of the wound layer and the first reference line or the second reference line in the other acquired image, so as to obtain an actual number of pixels included in a distance between the other electrode plate as well as the other separator in the winding substrate and the first reference line or the second reference line and further determine position information of the other electrode plate and separator based on the second actual distance corresponding to a single pixel in this image.

The actual numbers of pixels respectively included in the distance between the edge of the outer side surface of the wound layer and the first reference line or the second reference line and in the distance between the edge of the inner side surface of the to-be-wound layer and the first reference line or the second reference line are obtained to precisely detect position information of the edges of the two electrode plates and the two separators in the winding substrate.

Figure 10:
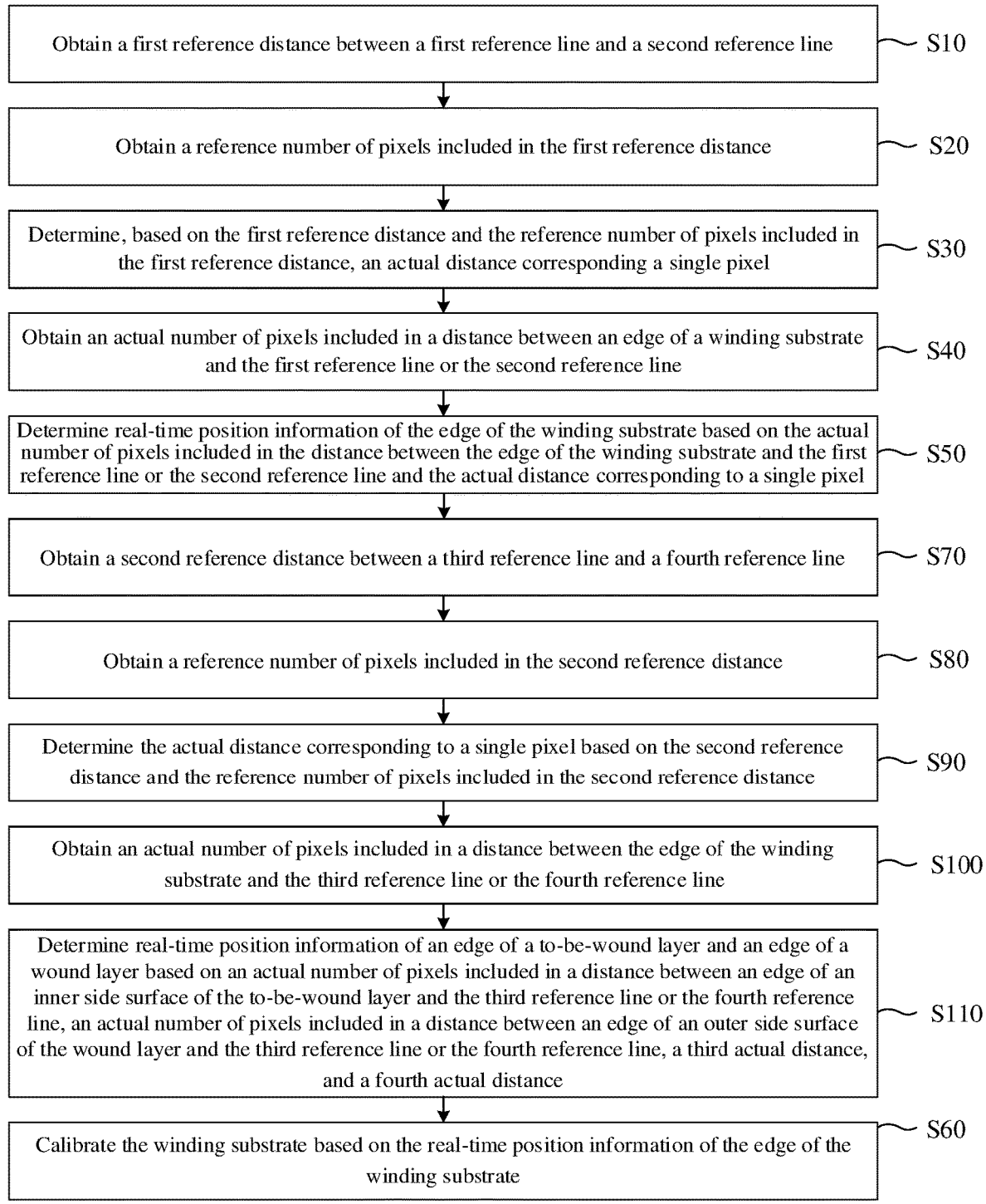
FIG. 10 is a schematic flowchart of a cell winding calibration method according to an embodiment of the present application.

FIG. 10 is a schematic flowchart of the cell winding calibration method according to an embodiment of the present application. The cell winding calibration method further includes the following step.

S70: Obtain a second reference distance between a third reference line and a fourth reference line.

The third reference line and the fourth reference line are located at the other end of a surface of the winding substrate opposite to the first reference line and the second reference line. The third reference line and the fourth reference line are parallel identification lines. The second reference distance remains unchanged in the cell winding process.

It should be noted that to ensure image acquisition and detection precision, a field of view of the image acquisition unit is usually small, that is, a framing imaging area is small. For some large winding substrates, when a framing imaging width of the image acquisition unit is less than a width of the winding substrate, one image including edges of both ends of the winding substrate cannot be acquired.

Figure 11:
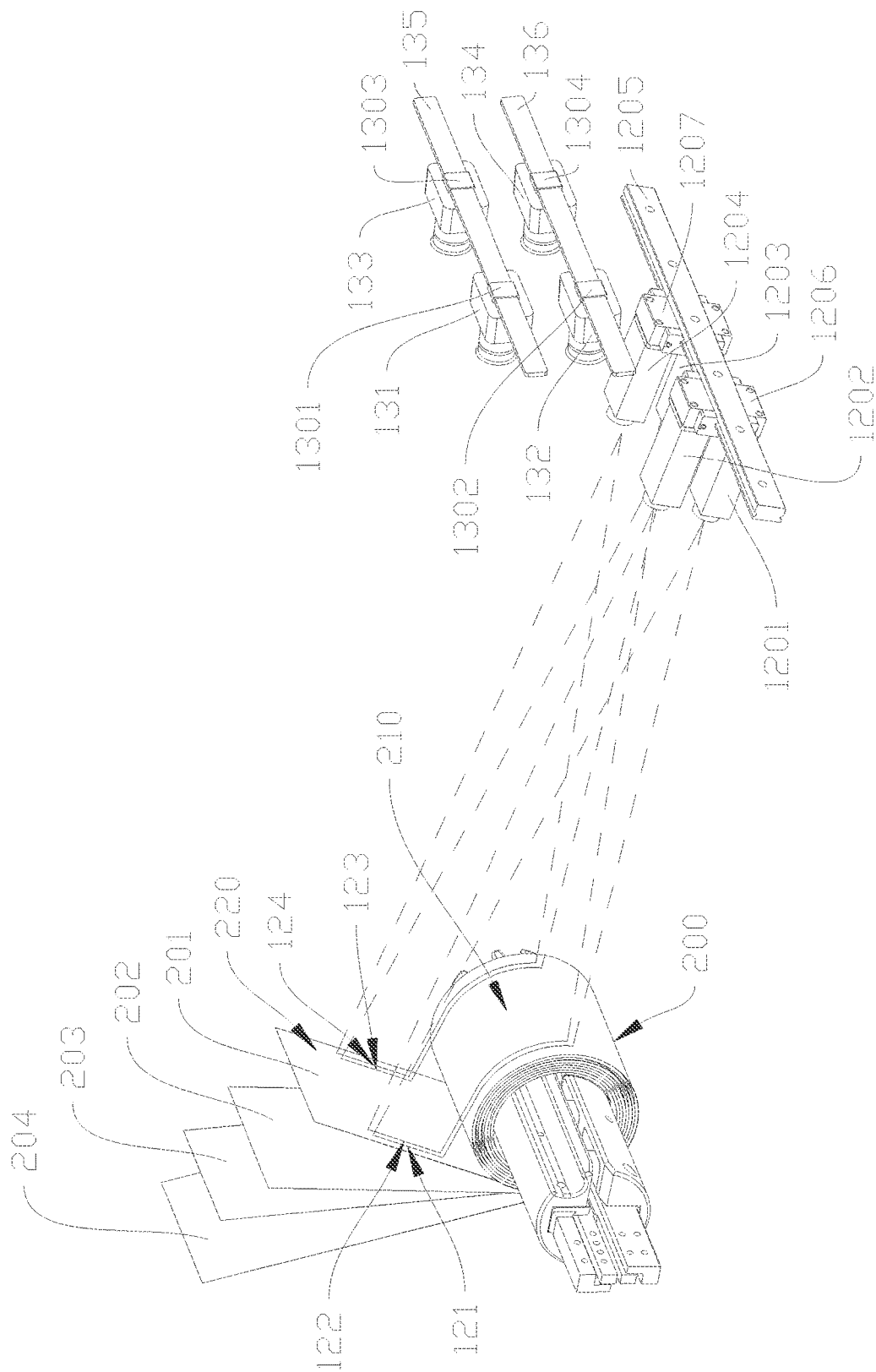
FIG. 11 is a schematic diagram of a structure of a cell winding calibration device according to still another embodiment of the present application.

FIG. 11 is a schematic diagram of the structure of the cell winding calibration device according to still another embodiment of the present application. In view of the above problem, in the present application, the first reference line 121 and the second reference line 122 are formed on a surface of one end of the winding substrate 200, and a third reference line 123 and a fourth reference line 124 are formed at the other end. In this way, it is ensured that there are two reference lines in each of images of the edges of the two ends of the winding substrate 200 when the image of the edges needs to be obtained, so that detection accuracy can be ensured. In addition, the framing imaging area of the image acquisition unit can be reduced, the acquired image can be optimized, and the detection precision can be improved.

Referring to FIG. 10 again, according to some embodiments of the present application, the cell winding calibration method further includes the following steps.

S80: Obtain a reference number of pixels included in the second reference distance.

S90: Determine, based on the second reference distance and the reference number of pixels included in the second reference distance, the actual distance corresponding to a single pixel.

The reference number of pixels included in the second reference distance in the image is obtained, and the actual distance corresponding to a single pixel in the image is determined based on the second reference distance and the reference number of pixels included in the second reference distance. In this way, a position of an edge of the other end of the winding substrate in the image is detected.

With continued reference to FIG. 10, according to some embodiments of the present application, the cell winding calibration method further includes the following step.

S100: Obtain an actual number of pixels included in a distance between the edge of the winding substrate and the third reference line or the fourth reference line.

The actual number of pixels included in the distance between the edge of the winding substrate and the third reference line or the fourth reference line is obtained and combined with the actual distance corresponding to a single pixel that is determined in step S90 to determine an actual distance between the edge of the other end of the winding substrate and the third reference line or the fourth reference line, so as to obtain real-time position information of the edge of the other end of the winding substrate and further determine whether the position of the edge of the other end of the winding substrate needs to be calibrated.

FIG. 12 is a schematic flowchart of the cell winding calibration method according to an embodiment of the present application. According to some embodiments of the present application, step S80 includes the following steps.

S81: Obtain, on the inner side surface of the to-be-wound layer, a third reference number of pixels included in the second reference distance.

S82: Obtain, on the outer side surface of the wound layer, a fourth reference number of pixels included in the second reference distance.

FIG. 13 is a schematic flowchart of the cell winding calibration method according to an embodiment of the present application. According to some embodiments of the present application, step S90 includes the following steps.

S91: Determine, based on the second reference distance and the third reference number of pixels, a third actual distance corresponding to a single pixel.

S92: Determine, based on the second reference distance and the fourth reference number of pixels, a fourth actual distance corresponding to a single pixel.

In some embodiments, referring to FIG. 11 again, the image acquisition unit 130 may include four cameras with two in upper positions and the other two in lower positions. The two cameras in upper and lower positions on one side are configured to perform image acquisition on an edge of one end of the wound layer 210 and an edge of one end of the to-be-wound layer 220, respectively. The two cameras in upper and lower positions on the other side are configured to perform image acquisition on an edge of the other end of the wound layer 210 and an edge of the other end of the to-be-wound layer 220, respectively.

The third reference number of pixels included in the second reference distance is obtained on the inner side surface of the to-be-wound layer, and the third actual distance corresponding to a single pixel is determined based on the second reference distance and the third reference number of pixels. The fourth reference number of pixels included in the second reference distance is obtained on the outer side surface of the wound layer, and the fourth actual distance corresponding to a single pixel is determined based on the second reference distance and the fourth reference number of pixels, so that a problem that an image including both sides of the winding substrate cannot be acquired due to a limited image acquisition range is solved, and blurring of a part of surface during imaging of the winding substrate due to a small depth of field of the image acquisition unit can be effectively avoided. Image acquisition is performed on the inner side surface of the to-be-wound layer, the outer side surface of the wound layer, and each end separately, so that high resolutions are ensured in imaging of the edges of the two ends of both the inner side surface of the to-be-wound layer and the outer side surface of the wound layer, and the images are sharp. This helps improve the precision of detecting the positions of the edges of both ends of the winding substrate.

FIG. 14 is a schematic flowchart of the cell winding calibration method according to an embodiment of the present application. According to some embodiments of the present application, step S100 includes the following steps.

S101: Obtain an actual number of pixels included in a distance between the edge of the outer side surface of the wound layer and the third reference line or the fourth reference line.

S102: Obtain an actual number of pixels included in a distance between the edge of the inner side surface of the to-be-wound layer and the third reference line or the fourth reference line.

The actual numbers of pixels respectively included in the distance between the edge of the outer side surface of the wound layer and the third reference line or the fourth reference line and in the distance between the edge of the inner side surface of the to-be-wound layer and the third reference line or the fourth reference line are obtained to precisely detect position information of the edge of one end of each of the two electrode plates and the two separators in the winding substrate.

Referring to FIG. 10 again, according to some embodiments of the present application, the cell winding calibration method further includes the following step.

S110: Determine real-time position information of an edge of the to-be-wound layer and an edge of the wound layer based on the actual number of pixels included in the distance between the edge of the inner side surface of the to-be-wound layer and the third reference line or the fourth reference line, the actual number of pixels included in the distance between the edge of the outer side surface of the wound layer and the third reference line or the fourth reference line, the third actual distance, and the fourth actual distance.

In some embodiments, the actual number of pixels included in the distance between the edge of the inner side surface of the to-be-wound layer and the third reference line or the fourth reference line×the third actual distance=the actual distance between the edge of the inner side surface of the to-be-wound layer and the third reference line or the fourth reference line.

In some embodiments, the actual number of pixels included in the distance between the edge of the outer side surface of the wound layer and the third reference line or the fourth reference line×the fourth actual distance=the actual distance between the edge of the outer side surface of the wound layer and the third reference line or the fourth reference line.

The real-time position information of the edge of the inner side surface of the to-be-wound layer is determined based on the actual number of pixels included in the distance between the edge of the inner side surface of the to-be-wound layer and the third reference line or the fourth reference line and the third actual distance. The real-time position information of the edge of the outer side surface of the wound layer is determined based on the actual number of pixels included in the distance between the edge of the outer side surface of the wound layer and the third reference line or the fourth reference line and the fourth actual distance. In this way, positions of the edge of the inner side surface of the to-be-wound layer and the edge of the outer side surface of the wound layer are accurately detected, so as to subsequently provide effective data support for calibration of the winding substrate. This facilitates complete calibration at a time, and improves a success rate of winding the winding substrate.

Referring to FIG. 11, according to some embodiments of the present application, in a thickness direction of the winding substrate 200, that is, in a direction from the inner side surface to the outer side surface of the winding substrate 200, the winding substrate 200 includes a first electrode plate 201, a first separator 202, a second electrode plate 203, and a second separator 204.

In an implementation of this embodiment of the present application, FIG. 15 is a schematic flowchart of the cell winding calibration method according to an embodiment of the present application. Referring to FIG. 15, step S41 includes the following steps.

Step S411: Obtain, on the outer side surface of the wound layer, a first actual number of pixels included in a distance between an edge of one end of the first electrode plate and the first reference line or the second reference line.

Step S412: Obtain a second actual number of pixels included in a distance between an edge of one end of the first separator and the first reference line or the second reference line.

In an implementation of this embodiment of the present application, FIG. 16 is a schematic flowchart of the cell winding calibration method according to an embodiment of the present application. Referring to FIG. 16, step S42 includes the following steps.

Step S421: Obtain, on the inner side surface of the to-be-wound layer, a third actual number of pixels included in a distance between an edge of one end of the second electrode plate and the first reference line or the second reference line.

Step S422: Obtain a fourth actual number of pixels included in a distance between an edge of one end of the second separator and the first reference line or the second reference line.

In an implementation of this embodiment of the present application, FIG. 17 is a schematic flowchart of the cell winding calibration method according to an embodiment of the present application. Referring to FIG. 17, step S101 includes the following steps.

Step S111: Obtain, on the outer side surface of the wound layer, a fifth actual number of pixels included in a distance between an edge of the other end of the first electrode plate and the third reference line or the fourth reference line.

Step S112: Obtain a sixth actual number of pixels included in a distance between an edge of the other end of the first separator and the third reference line or the fourth reference line.

In an implementation of this embodiment of the present application, FIG. 18 is a schematic flowchart of the cell winding calibration method according to an embodiment of the present application. Referring to FIG. 18, step S102 includes the following steps.

Step S121: Obtain, on the inner side surface of the to-be-wound layer, a seventh actual number of pixels included in a distance between an edge of the other end of the second electrode plate and the third reference line or the fourth reference line.

Step S122: Obtain an eighth actual number of pixels included in a distance between an edge of the other end of the second separator and the third reference line or the fourth reference line.

In some embodiments, FIG. 19a to FIG. 19d respectively show images acquired by the four cameras with two in upper positions and the other two in lower positions in the cell winding calibration method according to an embodiment of the present application. For case of distinguishing, in the figures, a double dot dash line indicates an edge of the image, and a dash line indicates an edge of the second electrode plate 203 recognized by using the second separator 204 when image acquisition is performed on the outer side surface of the wound layer 210.

As shown in the figures, FIG. 19a shows an image acquired from an edge of one end of the inner side surface of the to-be-wound layer 220. The first actual number m1 of pixels included in the distance between an edge 2011 of the one end of the first electrode plate and the first reference line 121 may be obtained from the image and the second actual number m2 of pixels included in the distance between an edge 2021 of the one end of the first separator and the first reference line 121 may be obtained from the image.

FIG. 19b shows an image acquired from an edge of one end of the outer side surface of the wound layer 210. The third actual number m3 of pixels included in the distance between an edge 2031 of the one end of the second electrode plate and the first reference line 121 may be obtained from the image and the fourth actual number m4 of pixels included in the distance between an edge 2041 of the one end of the second separator and the first reference line 121 may be obtained from the image.

FIG. 19c shows an image acquired from an edge of the other end of the inner side surface of the to-be-wound layer 220. The fifth actual number n1 of pixels included in the distance between an edge 2012 of the other end of the first electrode plate and the fourth reference line 124 may be obtained from the image and the sixth actual number n2 of pixels included in the distance between an edge 2022 of the other end of the first separator and the fourth reference line 124 may be obtained from the image.

FIG. 19d shows an image acquired from an edge of the other end of the outer side surface of the wound layer 210. The seventh actual number n3 of pixels included in the distance between an edge 2032 of the other end of the second electrode plate and the fourth reference line 124 may be obtained from the image and the eighth actual number n4 of pixels included in the distance between an edge 2042 of the other end of the second separator and the fourth reference line 124 may be obtained from the image.

The actual numbers of pixels included in the distances between the reference lines and the edges of the two ends of the first electrode plate, the first separator, the second electrode plate, as well as the second separator are obtained and combined with the above obtained actual distance corresponding to a single pixel in each image, to calculate an actual distance between an edge of the first electrode plate and the first reference line or the second reference line, an actual distance between an edge of the first separator and the first reference line or the second reference line, an actual distance between the second electrode plate and the third reference line or the fourth reference line, and an actual distance between the second separator and the third reference line or the fourth reference line, respectively. Further, a distance between the edges of the electrode plates and distances between the edges of the electrode plates and the separators are calculated. In this way, whether positions of the edges of the electrode plates and the separators are accurate is determined.

FIG. 20 is a schematic flowchart of the cell winding calibration method according to an embodiment of the present application. According to some embodiments of the present application, step S50 includes the following steps.

Step S51: Determine real-time position information of the edge of the one end of the first electrode plate based on the first actual number of pixels and the first actual distance.

Referring to FIG. 19a, when the first actual number of pixels included in the distance between the edge of the one end of the first electrode plate and the first reference line is m1, a calculation step is:

$m1 \times$ the first actual distance = the actual distance between the edge of the one end of the first electrode plate and the first reference line.

Step S52: Determine real-time position information of the edge of the one end of the first separator based on the second actual number of pixels and the first actual distance.

Referring to FIG. 19a, when the second actual number of pixels included in the distance between the edge of the one end of the first separator and the first reference line is m2, a calculation step is:

$m2 \times$ the first actual distance = the actual distance between the edge of the one end of the first separator and the first reference line.

The actual distance between the edge of the one end of the first electrode plate and the first reference line–the actual distance between the edge of the one end of the first separator and the first reference line=an actual distance between the edge of the one end of the first electrode plate and the edge of the one end of the first separator.

S53: Determine real-time position information of the edge of the one end of the second electrode plate based on the third actual number of pixels and the second actual distance.

Referring to FIG. 19b, when the third actual number of pixels included in the distance between the edge of the one end of the second electrode plate and the first reference line is m3, a calculation step is:

$$m3 \times \text{the second actual distance} =$$
$$\text{the actual distance between the edge of the one end}$$
$$\text{of the second electrode plate and the first reference line.}$$

Step S54: Determine real-time position information of the edge of the one end of the second separator based on the fourth actual number of pixels and the second actual distance.

Referring to FIG. 19b, when the fourth actual number of pixels included in the distance between the edge of the one end of the second separator and the first reference line is m4, a calculation step is:

$$m4 \times \text{the second actual distance} = \text{the actual distance between the edge}$$
$$\text{of the one end of the second separator and the first reference line.}$$

The actual distance between the edge of the one end of the second electrode plate and the first reference line–the actual distance between the edge of the one end of the second separator and the first reference line=an actual distance between the edge of the one end of the second electrode plate and the edge of the one end of the second separator.

The actual distance between the edge of the one end of the first electrode plate and the first reference line–the actual distance between the edge of the one end of the second electrode plate and the first reference line=an actual distance between the edge of the one end of the first electrode plate and the edge of the one end of the second electrode plate.

In an implementation of this embodiment of the present application, FIG. 21 is a schematic flowchart of the cell winding calibration method according to an embodiment of the present application. Step S110 includes the following steps.

Step S1101: Determine real-time position information of the edge of the other end of the first electrode plate based on the fifth actual number of pixels and the third actual distance.

Referring to FIG. 19c, when the fifth actual number of pixels included in the distance between the edge of the other end of the first electrode plate and the fourth reference line is n1, a calculation step is:

$$n1 \times \text{the third actual distance} =$$
$$\text{the actual distance between the edge of the other end}$$
$$\text{of the first electrode plate and the fourth reference line.}$$

Step S1102: Real-time position information of the edge of the other end of the first separator is determined based on the sixth actual number of pixels and the third actual distance.

Referring to FIG. 19c, when the sixth actual number of pixels included in the distance between the edge of the other end of the first separator and the fourth reference line is n2, a calculation step is:

$$n2 \times \text{the third actual distance} = \text{the actual distance between the edge of}$$
$$\text{the other end of the first separator and the fourth reference line.}$$

The actual distance between the edge of the other end of the first electrode plate and the fourth reference line–the actual distance between the edge of the other end of the first separator and the fourth reference line=an actual distance between the edge of the other end of the first electrode plate and the edge of the other end of the first separator.

Step S1103: Determine real-time position information of the edge of the other end of the second electrode plate based on the seventh actual number of pixels and the fourth actual distance.

Referring to FIG. 19d, when the seventh actual number of pixels included in the distance between the edge of the other end of the second electrode plate and the fourth reference line is n3, a calculation step is:

$$n3 \times \text{the fourth actual distance} =$$
$$\text{the actual distance between the edge of the other end}$$
$$\text{of the second electrode plate and the fourth reference line.}$$

Step S1104: Determine real-time position information of the edge of the other end of the second separator based on the eighth actual number of pixels and the fourth actual distance.

Referring to FIG. 19d, when the eighth actual number of pixels included in the distance between the edge of the other end of the second separator and the fourth reference line is n4, a calculation step is:

$$n4 \times \text{the fourth actual distance} = \text{the actual distance between the edge of}$$
$$\text{the other end of the second separator and the fourth reference line.}$$

The actual distance between the edge of the other end of the second electrode plate and the fourth reference line–the actual distance between the edge of the other end of the second separator and the fourth reference line=an actual distance between the edge of the other end of the second electrode plate and the edge of the other end of the second separator.

The actual distance between the edge of the other end of the first electrode plate and the fourth reference line–the actual distance between the edge of the other end of the second electrode plate and the fourth reference line=an actual distance between the edge of the other end of the first electrode plate and the edge of the other end of the second electrode plate.

The real-time position information of the two ends of the first electrode plate, the first separator, the second electrode plate, and the second separator is determined based on the first actual number of pixels as well as the second actual number of pixels and the first actual distance, the third actual number of pixels as well as the fourth actual number of pixels and the second actual distance, the fifth actual number of pixels as well as the sixth actual number of pixels and the third actual distance, and the seventh actual number of pixels as well as the eighth actual number of pixels and the fourth actual distance, respectively. Further, the real-time position information of the two ends of the first electrode plate, the first separator, the second electrode plate, and the second separator may be compared with standard positions, so as to determine whether the positions of the first electrode plate, the first separator, the second electrode plate, and the second separator need to be calibrated. In this way, a success rate of winding the winding substrate is ensured.

Figure 22:
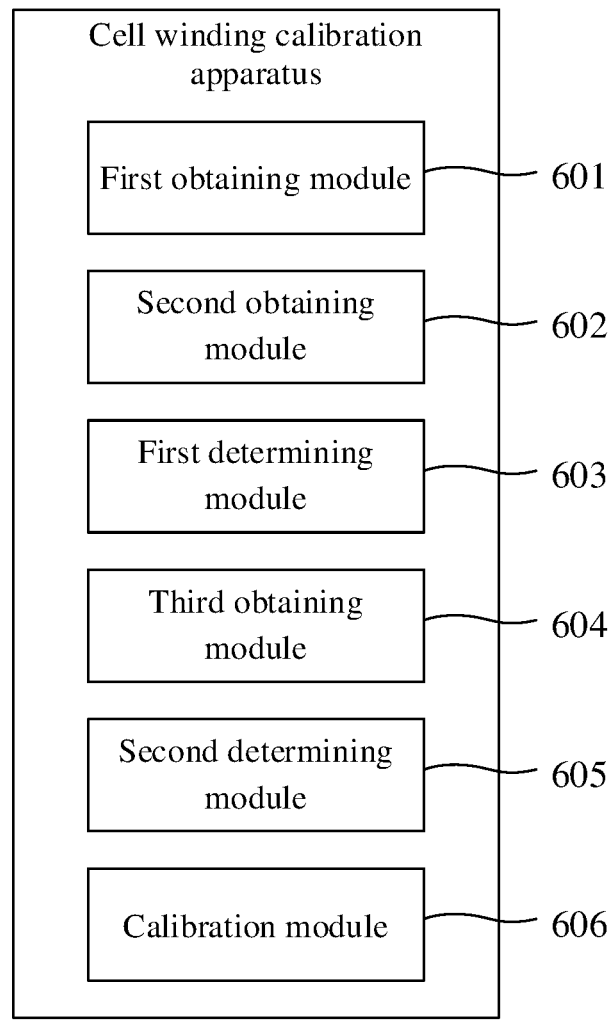
FIG. 22 is a block diagram of a cell winding calibration apparatus according to an embodiment of the present application.

An embodiment of the present application further provides a cell winding calibration apparatus. FIG. 22 is a block diagram of the cell winding calibration apparatus according to an embodiment of the present application. The cell winding calibration apparatus includes: a first obtaining module 601 configured to obtain a first reference distance between a first reference line and a second reference line, where the first reference line and the second reference line are parallel identification lines formed on a winding substrate, and the first reference distance remains unchanged in a cell winding process; a second obtaining module 602 configured to obtain a reference number of pixels included in the first reference distance; a first determining module 603 configured to determine, based on the first reference distance and the reference number of pixels included in the first reference distance, an actual distance corresponding to a single pixel; a third obtaining module 604 configured to obtain an actual number of pixels included in a distance between an edge of the winding substrate and the first reference line or the second reference line; a second determining module 605 configured to determine real-time position information of the edge of the winding substrate based on the actual number of pixels included in the distance between the edge of the winding substrate and the first reference line or the second reference line and the actual distance corresponding to a single pixel; and a calibration module 606 configured to calibrate the winding substrate based on the real-time position information of the edge of the winding substrate.

For specific limitations on the cell winding calibration apparatus, reference may be made to the above limitations on the cell winding calibration method. Details are not described herein again. All or some of the modules in the above cell winding calibration apparatus may be implemented by software, hardware, or a combination thereof. The modules may be embedded or independent of a processor in an electronic device in the form of hardware, or may be stored in a memory of the electronic device in the form of software, so as to be invoked by the processor to perform the operations corresponding to the modules.

Referring to FIG. 4 again, according to another aspect of the embodiments of the present application, there is further provided a cell winding calibration device. The cell winding calibration device 100 includes a winding unit 110, a beam emission unit 120, an image acquisition unit 130, a control unit 140, and a calibration unit 150. The winding unit 110 is configured to wind a winding substrate 200. The beam emission unit 120 is disposed on one side of the winding unit 110, and is configured to form a first reference line 121 and a second reference line 122 on the winding substrate 200. The first reference line 121 and the second reference line 122 are parallel identification lines formed on the winding substrate 200. A distance between the first reference line 121 and the second reference line 122 is a first reference distance. The first reference distance remains unchanged in a cell winding process. The image acquisition unit 130 is disposed on one side of the winding unit 110, and is configured to perform image acquisition on the winding substrate 200, and send an acquired image to the control unit 140. The control unit 140 is configured to obtain, based on the image acquired by the image acquisition unit, a reference number of pixels included in the first reference distance, and determine, based on the first reference distance and the reference number of pixels included in the first reference distance, an actual distance corresponding to a single pixel. The control unit 140 is further configured to obtain, based on the image acquired by the image acquisition unit, an actual number of pixels included in a distance between an edge of the winding substrate 200 and the first reference line 121 or the second reference line 122, determine real-time position information of the edge of the winding substrate 200 based on the actual number of pixels included in the distance between the edge of the winding substrate 200 and the first reference line 121 or the second reference line 122 and the actual distance corresponding to a single pixel, and send the real-time position information of the edge of the winding substrate 200 to the calibration unit 150. The calibration unit 150 is configured to calibrate the winding substrate 200 based on the real-time position information.

The winding unit 110 may rotate to wind the winding substrate 200 on a winding needle on the winding unit. The winding unit 110 may be driven by a motor to rotate. The motor is connected to the control unit 140, to implement control of the control unit 140 over the winding unit 110.

The beam emission unit 120 may be a beam emitter, and may form a line segment beam on a receiving surface.

The image acquisition unit 130 may be an image sensor, for example, an ordinary camera or a linear array camera.

The control unit 140 may be a controller, and may perform analytical processing on an image signal, a digital signal, and the like.

The calibration unit 150 may be a manipulator or another calibration mechanism, and may perform position adjustment on the edge of the winding substrate 200.

According to the present application, the control unit 140 determines, based on the first reference distance between the first reference line 121 and the second reference line 122 and the reference number of pixels included in the first reference distance, which are obtained from the image acquired by the image acquisition unit 130, the actual distance corresponding to a single pixel. The first reference line 121 and the second reference line 122 are parallel identification lines formed by the beam emission unit 120 on the winding substrate 200, and the first reference distance remains unchanged in the cell winding process. Therefore, in the winding process, even though a thickness of the winding substrate 200 increases, an object distance changes, and a resolution of the acquired image changes accordingly, the actual distance corresponding to a single pixel can still be accurately determined. The first reference line 121 and the second reference line 122 are parallel identification lines formed on the winding substrate 200, so that the first reference line 121 and the second reference line 122 are easier to recognize during imaging. In addition, to avoid difficulty in clearly recognizing a distance between edges of a separator and an electrode plate due to an image blur and an excessively short distance between the edges of the separator and the electrode plate, numbers of pixels included in distances between the edges of the separator as well as the electrode plate in the winding substrate 200 and the first reference line 121 or the second reference line 122 are read and combined with the actual distance corresponding to a single pixel to accurately determine the real-time position information of the edge of the winding substrate 200, so as to accurately and effectively calibrate the edge of the winding substrate 200 by using the calibration unit 150. In this way, a qualification rate of winding the winding substrate is ensured.

According to some embodiments of the present application, a minimum recognition distance of the image acquisition unit 130 is less than or equal to the first reference distance.

A purpose of setting the minimum recognition distance of the image acquisition unit 130 to be less than or equal to the first reference distance is to accurately obtain the actual distance corresponding to a single pixel and avoid a failure or error, due to that the first reference distance in the image acquired by the image acquisition unit 130 is excessively short, in obtaining the reference number of pixels included in the first reference distance.

Referring to FIG. 4 again, according to some embodiments of the present application, the winding substrate 200 includes a wound layer 210 formed after a winding operation already performed and a to-be-wound layer 220 on which a winding operation is to be performed. The beam emission unit 120 includes a first linear beam emitter 1201 and a second linear beam emitter 1202 that are disposed side by side in a width direction of the winding substrate 200. The first linear beam emitter 1201 is configured to form the first reference line 121 on an outer side surface of the wound layer 210 and an inner side surface of the to-be-wound layer 220. The second linear beam emitter 1202 is configured to form the second reference line 122 on the outer side surface of the wound layer 210 and the inner side surface of the to-be-wound layer 220.

The winding substrate 200 generally includes a positive electrode plate, a first separator, a negative electrode plate, and a second separator. Surface areas of the separators are larger than those of the positive electrode plate and the negative electrode plate, so that the separators can completely isolate the positive electrode plate from the negative electrode plate, to avoid a risk of a short circuit caused by contact between the electrode plates. In general, the separator is transparent to some extent, but the electrode plate is not transparent. Therefore, considering that when image acquisition is performed from one side of the winding substrate 200, edges of only one electrode plate and only one separator can be seen, and edges of the electrode plate and the separator that are away from the image acquisition unit 130 cannot be acquired, in the present application, the first reference line 121 and the second reference line 122 are formed on both the outer side surface of the wound layer 210 and the inner side surface of the to-be-wound layer 220, and image acquisition is performed on the outer side surface of the wound layer 210 and the inner side surface of the to-be-wound layer 220 at a time, to implement image acquisition and recognition of the edges of both electrode plates and both separators.

Referring to FIG. 8 again, according to some embodiments of the present application, the image acquisition unit 130 includes a first camera 131 and a second camera 132 that are disposed side by side in a direction perpendicular to a winding axis of the winding unit 110. The first camera 131 is configured to perform image acquisition on the inner side surface of the to-be-wound layer 220. The second camera 132 is configured to perform image acquisition on the outer side surface of the wound layer 210.

In some embodiments of the present application, the image acquisition unit 130 includes the first camera 131 and the second camera 132 that are disposed side by side in the direction perpendicular to the winding axis of the winding unit 110 to implement image acquisition on the inner side surface of the to-be-wound layer 220 and the outer side surface of the wound layer 210 separately, so as to obtain an image of the inner side surface of the to-be-wound layer 220 and an image of the outer side surface of the wound layer 210, respectively. A first reference number of pixels and a second reference number of pixels included in the first reference distance are obtained from the image of the inner side surface of the to-be-wound layer 220 and the image of the outer side surface of the wound layer 210, respectively. A first actual distance and a second actual distance that correspond to a single pixel in the two images are determined based on the first reference distance, the first reference number of pixels, and the second reference number of pixels, so that blurring of a part of surface during imaging of the winding substrate due to a small depth of field of the image acquisition unit can be effectively avoided. Image acquisition is performed on the inner side surface of the to-be-wound layer 220 and the outer side surface of the wound layer 210 separately, so that high resolutions are ensured in imaging of both the inner side surface of the to-be-wound layer 220 and the outer side surface of the wound layer 210, and the images are sharp. This helps improve precision of detecting a position of the edge of the winding substrate.

Referring to FIG. 11 again, according to some embodiments of the present application, the beam emission unit 120 further includes a third linear beam emitter 1203 and a fourth linear beam emitter 1204 that are disposed side by side. The third linear beam emitter 1203 as well as the fourth linear beam emitter 1204 and the first linear beam emitter 1201 as well as the second linear beam emitter 1202 are aligned with two ends of the winding substrate 200 in the width direction, respectively. The first linear beam emitter 1201 is configured to form the first reference line 121 at one end of the outer side surface of the wound layer 210 and one end of the inner side surface of the to-be-wound layer 220. The second linear beam emitter 1202 is configured to form the second reference line 122 at the one end of the outer side surface of the wound layer 210 and the one end of the inner side surface of the to-be-wound layer 220. The third linear beam emitter 1203 is configured to form a third reference line 123 at the other end of the outer side surface of the wound layer 210 and the other end of the inner side surface of the to-be-wound layer 220. The fourth linear beam emitter 1204 is configured to form a fourth reference line 124 at the other end of the outer side surface of the wound layer 210 and the other end of the inner side surface of the to-be-wound layer 220. The third reference line 123 and the fourth reference line 124 are parallel identification lines. A distance between the third reference line 123 and the fourth reference line 124 is a second reference distance. The second reference distance remains unchanged in the cell winding process.

In some embodiments of the present application, the first reference line 121 and the second reference line 122 are formed on a surface of one end of the winding substrate 200, and the third reference line 123 and the fourth reference line 124 are formed at the other end. In this way, it is ensured that there are two reference lines in each of images of the edges of the two ends of the winding substrate 200 when the image of the edges needs to be obtained, so that detection accuracy can be ensured. In addition, a framing imaging area of the image acquisition unit can be reduced, the acquired image can be optimized, and detection precision can be improved.

With continued reference to FIG. 11, according to some embodiments of the present application, the image acquisition unit 130 further includes a third camera 133 and a fourth camera 134 that are disposed side by side in the direction perpendicular to the winding axis of the winding unit 110. The third camera 133 as well as the fourth camera 134 and the first camera 131 as well as the second camera 132 are aligned with the two ends of the winding substrate 200 in the width direction, respectively. The first camera 131 is configured to perform image acquisition on an edge of the one end of the inner side surface of the to-be-wound layer 220. The second camera 132 is configured to perform image acquisition on an edge of the one end of the outer side surface of the wound layer 210. The third camera 133 is configured to perform image acquisition on an edge of the other end of the inner side surface of the to-be-wound layer 220. The fourth camera 134 is configured to perform image acquisition on an edge of the other end of the outer side surface of the wound layer 210.

In some embodiments of the present application, the image acquisition unit 130 includes the first camera 131, the second camera 132, the third camera 133, and the fourth camera 134, and the third camera 133 as well as the fourth camera 134 and the first camera 131 as well as the second camera 132 are respectively aligned with the two ends of the winding substrate 200, so that a problem that an image including both sides of the winding substrate 200 cannot be acquired due to a limited image acquisition range is solved, and blurring of a part of surface during imaging of the winding substrate 200 due to a small depth of field of the image acquisition unit 130 can be effectively avoided. Image acquisition is performed on the inner side surface of the to-be-wound layer 220, the outer side surface of the wound layer 210, and each end separately, so that high resolutions are ensured in imaging of the edges of the two ends of both the inner side surface of the to-be-wound layer 220 and the outer side surface of the wound layer 210, and images are sharp. This helps improve precision of detecting positions of edges of two ends of the winding substrate 200.

With continued reference to FIG. 11, according to some embodiments of the present application, the first camera 131 is configured to perform, through the inner side surface of the to-be-wound layer 220, image acquisition on an edge of one end of a first electrode plate 201 and an edge of one end of a first separator 202 of the winding substrate 200. The second camera 132 is configured to perform, through the outer side surface of the wound layer 210, image acquisition on an edge of one end of a second electrode plate 203 and an edge of one end of a second separator 204 of the winding substrate 200. The third camera 133 is configured to perform, through the inner side surface of the to-be-wound layer 220, image acquisition on an edge of the other end of the first electrode plate 201 and an edge of the other end of the first separator 202 of the winding substrate 200. The fourth camera 134 is configured to perform, through the outer side surface of the wound layer 210, image acquisition on an edge of the other end of the second electrode plate 203 and an edge of the other end of the second separator 204 of the winding substrate 200.

Image acquisition is performed on the edges of the two ends of the first electrode plate 201, the first separator 202, the second electrode plate 203, and the second separator 204 respectively by using the four cameras, to calculate an actual distance between an edge of the first electrode plate and the first reference line or the second reference line, an actual distance between an edge of the first separator and the first reference line or the second reference line, an actual distance between the second electrode plate and the third reference line or the fourth reference line, and an actual distance between the second separator and the third reference line or the fourth reference line, respectively. Further, a distance between the edges of the electrode plates and distances between the edges of the electrode plates and the separators are calculated. In this way, whether positions of the edges of the electrode plates and the separators are accurate is determined.

With continued reference to FIG. 11, according to some embodiments of the present application, the beam emission unit 120 further includes an emitter guide rail 1205, a first emitter slider 1206, and a second emitter slider 1207. The emitter guide rail 1205 is parallel to the winding axis of the winding unit 110. The first emitter slider 1206 and the second emitter slider 1207 are disposed on the emitter guide rail 1205 in a sliding manner. Both the first linear beam emitter 1201 and the second linear beam emitter 1202 are fixed on the first emitter slider 1206. Both the third linear beam emitter 1203 and the fourth linear beam emitter 1204 are fixed on the second emitter slider 1207.

In some embodiments, the emitter guide rail 1205 may be a linear guide rail. A sliding groove is formed in the emitter guide rail 1205. The first emitter slider 1206 and the second emitter slider 1207 may be connected to the interior of the sliding groove of the emitter guide rail 1205 through rollers or sliding structures in a sliding manner, so that the first emitter slider 1206 and the second emitter slider 1207 slide on the emitter guide rail 1205.

The first linear beam emitter 1201 as well as the second linear beam emitter 1202 and the third linear beam emitter 1203 as well as the fourth linear beam emitter 1204 are respectively fixed on the first emitter slider 1206 and the second emitter slider 1207 through clamping or a threaded connection.

The beam emission unit 120 includes the emitter guide rail 1205, the first emitter slider 1206, and the second emitter slider 1207. The emitter guide rail 1205 is parallel to the winding axis of the winding unit 110. The first emitter slider 1206 and the second emitter slider 1207 are disposed on the emitter guide rail 1205 in the sliding manner. Both the first linear beam emitter 1201 and the second linear beam emitter 1202 are fixed on the first emitter slider 1206. Both the third linear beam emitter 1203 and the fourth linear beam emitter 1204 are fixed on the second emitter slider 1207. Therefore, the first emitter slider 1206 or the second emitter slider 1207 can slide on the emitter guide rail 1205 to adjust a distance between the first reference line 121 as well as the second reference line 122 and the third reference line 123 as well as the fourth reference line 124. In this way, the distance between the reference lines at the two ends can be correspondingly adjusted based on winding substrates 200 of different widths. Therefore, compatibility of the device is improved.

With continued reference to FIG. 11, according to some embodiments of the present application, the image acquisition unit 130 further includes a first camera guide rail 135, a second camera guide rail 136, a first camera slider 1301, a second camera slider 1302, a third camera slider 1303, and a fourth camera slider 1304. Both the first camera guide rail 135 and the second camera guide rail 136 are parallel to the winding axis of the winding unit 110. The first camera 131, the second camera 132, the third camera 133, and the fourth camera 134 are fixed on the first camera slider 1301, the second camera slider 1302, the third camera slider 1303, and the fourth camera slider 1304, respectively. The first camera slider 1301 and the third camera slider 1303 are disposed on the first camera guide rail 135 in the sliding manner. The second camera slider 1302 and the fourth camera slider 1304 are disposed on the second camera guide rail 136 in the sliding manner.

In some embodiments, the first camera slider 1301 as well as the third camera slider 1303 and the second camera slider 1302 as well as the fourth camera slider 1304 may respectively sleeve the first camera guide rail 135 and the second camera guide rail 136 in the sliding manner in a manner shown in FIG. 11, or may be respectively connected to the first camera guide rail 135 and the second camera guide rail 136 in the sliding manner through the sliding grooves and the rollers or the sliding structures.

The camera may be fixed on the camera slider through clamping or a threaded connection.

The image acquisition unit 130 includes the first camera guide rail 135, the second camera guide rail 136, the first camera slider 1301, the second camera slider 1302, the third camera slider 1303, and the fourth camera slider 1304. Both the first camera guide rail 135 and the second camera guide rail 136 are parallel to the winding axis of the winding unit 110. The first camera 131, the second camera 132, the third camera 133, and the fourth camera 134 are respectively fixed on the first camera slider 1301, the second camera slider 1302, the third camera slider 1303, and the fourth camera slider 1304. The first camera slider 1301 and the third camera slider 1303 are disposed on the first camera guide rail 135 in the sliding manner. The second camera slider 1302 and the fourth camera slider 1304 are disposed on the second camera guide rail 136 in the sliding manner. A distance between the first camera guide rail 135 and the second camera guide rail 136 may be adjusted to adjust a distance between the first camera 131 and the second camera 132 and a distance between the third camera 133 and the fourth camera 134. The first camera slider 1301 or the third camera slider 1303 slides on the first camera guide rail 135 to adjust a distance between the first camera 131 and the third camera 133. The second camera slider 1302 or the fourth camera slider 1304 slides on the second camera guide rail 136 to adjust a distance between the second camera 132 and the fourth camera 134. In this way, a position of an image acquisition region can be correspondingly adjusted based on winding substrates 200 of different widths and different thicknesses. Therefore, the compatibility of the cell winding calibration device 100 is improved.

According to some embodiments of the present application, an embodiment of the present application further provides an electronic device. The electronic device includes: at least one processor; and a memory communicatively connected to the at least one processor. The memory stores instructions executable by the at least one processor. The instructions, when executed by the at least one processor, cause the at least one processor to perform the cell winding calibration method in any one of the above embodiments.

An embodiment of the present application further provides a cell winding system. The cell winding system includes the cell winding calibration device in any one of the above embodiments. The cell winding system provided in this embodiment of the present application may accurately and effectively calibrate an edge of a winding substrate, so as to ensure a qualification rate of winding the winding substrate.

According to some embodiments of the present application, an embodiment of the present application further provides a computer-readable storage medium storing a computer program. The computer program, when executed by a processor, implements the cell winding calibration method in any one of the above embodiments. For example, a non-transitory computer-readable storage medium may be a ROM, a random access memory (RAM), a CD-ROM, a magnetic tape, a floppy disk, or an optical data storage device.

According to some embodiments of the present application, an embodiment of the present application further provides a computer program product including a computer program. The computer program, when executed by a processor, implements the cell winding calibration method in any one of the above embodiments. The computer program product includes one or more computer instructions. When the computer instructions are loaded and executed on the computer, some or all of the method may be implemented completely or partially based on the processes or functions as described in the embodiments of the present application.

Finally, it should be noted that the above embodiments are merely used for illustrating rather than limiting the technical solutions of the present application. Although the present application has been illustrated in detail with reference to the above embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A cell winding calibration method, comprising:
    obtaining a first reference distance between a first reference line and a second reference line, wherein the first reference line and the second reference line are parallel identification lines formed on a winding substrate, and the first reference distance remains unchanged in a cell winding process;
    obtaining a reference number of pixels comprised in the first reference distance;
    determining, based on the first reference distance and the reference number of pixels comprised in the first reference distance, an actual distance corresponding to a single pixel;
    obtaining an actual number of pixels comprised in a distance between an edge of the winding substrate and the first reference line or the second reference line;
    determining real-time position information of the edge of the winding substrate based on the actual number of pixels comprised in the distance between the edge of the winding substrate and the first reference line or the second reference line and the actual distance corresponding to a single pixel; and
    calibrating the winding substrate based on the real-time position information of the edge of the winding substrate.

2. The cell winding calibration method according to claim 1, wherein the reference number of pixels comprised in the first reference distance is at least one.

3. The cell winding calibration method according to claim 1, wherein the first reference line and the second reference line are parallel identification lines formed on two opposite surfaces of the winding substrate.

4. The cell winding calibration method according to claim 3, wherein:
the winding substrate comprises a wound layer formed after a winding operation already performed and a to-be-wound layer on which a winding operation is to be performed; and
obtaining the reference number of pixels comprised in the first reference distance comprises:
obtaining, on an inner side surface of the to-be-wound layer, a first reference number of pixels comprised in the first reference distance; and
obtaining, on an outer side surface of the wound layer away from a winding axis, a second reference number of pixels comprised in the first reference distance;
wherein the inner side surface of the to-be-wound layer and the outer side surface of the wound layer correspond to the two opposite surfaces of the winding substrate, respectively.

5. The cell winding calibration method according to claim 4, wherein determining, based on the first reference distance and the reference number of pixels comprised in the first reference distance, the actual distance corresponding to the single pixel comprises:
determining, based on the first reference distance and the first reference number of pixels, a first actual distance corresponding to a single pixel; and
determining, based on the first reference distance and the second reference number of pixels, a second actual distance corresponding to a single pixel.

6. The cell winding calibration method according to claim 5, wherein obtaining the actual number of pixels comprised in the distance between the edge of the winding substrate and the first reference line or the second reference line comprises:
obtaining an actual number of pixels comprised in a distance between an edge of the outer side surface of the wound layer and the first reference line or the second reference line; and
obtaining an actual number of pixels comprised in a distance between an edge of the inner side surface of the to-be-wound layer and the first reference line or the second reference line, wherein the edge of the winding substrate is an edge of one side in a width direction of the winding substrate.

7. The cell winding calibration method according to claim 1,
wherein in the width direction of the winding substrate, the first reference line and the second reference line are located at one end of the winding substrate;
the method further comprising:
obtaining a second reference distance between a third reference line and a fourth reference line, wherein the third reference line and the fourth reference line are located at the other end of a surface of the winding substrate opposite to the first reference line and the second reference line, the third reference line and the fourth reference line are parallel identification lines, and the second reference distance remains unchanged in the cell winding process.

8. The cell winding calibration method according to claim 7, further comprising:
obtaining a reference number of pixels comprised in the second reference distance; and
determining, based on the second reference distance and the reference number of pixels comprised in the second reference distance, the actual distance corresponding to a single pixel.

9. The cell winding calibration method according to claim 8, further comprising:
obtaining an actual number of pixels comprised in a distance between the edge of the winding substrate and the third reference line or the fourth reference line.

10. The cell winding calibration method according to claim 9, wherein:
the winding substrate comprises the wound layer formed after the winding operation already performed and the to-be-wound layer on which the winding operation is to be performed; and
obtaining the reference number of pixels comprised in the second reference distance comprises:
obtaining, on the inner side surface of the to-be-wound layer, a third reference number of pixels comprised in the second reference distance; and
obtaining, on the outer side surface of the wound layer, a fourth reference number of pixels comprised in the second reference distance.

11. The cell winding calibration method according to claim 10, wherein determining, based on the second reference distance and the reference number of pixels comprised in the second reference distance, the actual distance corresponding to the single pixel comprises:
determining, based on the second reference distance and the third reference number of pixels, a third actual distance corresponding to a single pixel; and
determining, based on the second reference distance and the fourth reference number of pixels, a fourth actual distance corresponding to a single pixel.

12. The cell winding calibration method according to claim 9, wherein:
the winding substrate comprises the wound layer formed after the winding operation already performed and the to-be-wound layer on which the winding operation is to be performed; and
obtaining the actual number of pixels comprised in the distance between the edge of the winding substrate and the third reference line or the fourth reference line comprises:
obtaining an actual number of pixels comprised in a distance between the edge of the outer side surface of the wound layer and the third reference line or the fourth reference line; and
obtaining an actual number of pixels comprised in a distance between the edge of the inner side surface of the to-be-wound layer and the third reference line or the fourth reference line.

13. The cell winding calibration method according to claim 12, further comprising:
determining real-time position information of an edge of the to-be-wound layer and an edge of the wound layer based on the actual number of pixels comprised in the distance between the edge of the inner side surface of the to-be-wound layer and the third reference line or the fourth reference line, the actual number of pixels comprised in the distance between the edge of the outer side surface of the wound layer and the third reference line or the fourth reference line, the third actual distance, and the fourth actual distance,
wherein the third actual distance is an actual distance corresponding to a single pixel that is determined based on the second reference distance and the third reference number of pixels; and the fourth actual distance is an actual distance corresponding to a single pixel that is determined based on the second reference distance and the fourth reference number of pixels.

14. The cell winding calibration method according to claim 13, wherein:
in a thickness direction of the winding substrate, the winding substrate comprises a first electrode plate, a first separator, a second electrode plate, and a second separator;
obtaining the actual number of pixels comprised in the distance between the edge of the outer side surface of the wound layer and the first reference line or the second reference line comprises:
  obtaining, on the outer side surface of the wound layer, a first actual number of pixels comprised in a distance between an edge of one end of the first electrode plate and the first reference line or the second reference line; and
  obtaining a second actual number of pixels comprised in a distance between an edge of one end of the first separator and the first reference line or the second reference line; and
obtaining the actual number of pixels comprised in the distance between the edge of the inner side surface of the to-be-wound layer and the first reference line or the second reference line comprises:
  obtaining, on the inner side surface of the to-be-wound layer, a third actual number of pixels comprised in a distance between an edge of one end of the second electrode plate and the first reference line or the second reference line; and
  obtaining a fourth actual number of pixels comprised in a distance between an edge of one end of the second separator and the first reference line or the second reference line.

15. The cell winding calibration method according to claim 14, wherein:
obtaining the actual number of pixels comprised in the distance between the edge of the outer side surface of the wound layer and the third reference line or the fourth reference line comprises:
  obtaining, on the outer side surface of the wound layer, a fifth actual number of pixels comprised in a distance between an edge of the other end of the first electrode plate and the third reference line or the fourth reference line; and
  obtaining a sixth actual number of pixels comprised in a distance between an edge of the other end of the first separator and the third reference line or the fourth reference line; and
obtaining the actual number of pixels comprised in the distance between the edge of the inner side surface of the to-be-wound layer and the third reference line or the fourth reference line comprises:
  obtaining, on the inner side surface of the to-be-wound layer, a seventh actual number of pixels comprised in a distance between an edge of the other end of the second electrode plate and the third reference line or the fourth reference line; and
  obtaining an eighth actual number of pixels comprised in a distance between an edge of the other end of the second separator and the third reference line or the fourth reference line.

16. The cell winding calibration method according to claim 15, wherein:
the reference number of pixels comprised in the first reference distance comprises the first reference number of pixels corresponding to the inner side surface of the to-be-wound layer and the second reference pixels corresponding to the outer side surface of the wound layer; and
determining the real-time position information of the edge of the winding substrate based on the actual number of pixels comprised in the distance between the edge of the winding substrate and the first reference line or the second reference line and the actual distance corresponding to the single pixel comprises:
  determining real-time position information of the edge of the one end of the first electrode plate based on the first actual number of pixels and the first actual distance corresponding to a single pixel that is determined based on the first reference distance and the first reference number of pixels;
  determining real-time position information of the edge of the one end of the first separator based on the second actual number of pixels and the first actual distance;
  determining real-time position information of the edge of the one end of the second electrode plate based on the third actual number of pixels and the second actual distance corresponding to a single pixel that is determined based on the first reference distance and the second reference number of pixels; and
  determining real-time position information of the edge of the one end of the second separator based on the fourth actual number of pixels and the second actual distance.

17. The cell winding calibration method according to claim 16, wherein determining the real-time position information of the edge of the to-be-wound layer and the edge of the wound layer based on the actual number of pixels comprised in the distance between the edge of the inner side surface of the to-be-wound layer and the third reference line or the fourth reference line, the actual number of pixels comprised in the distance between the edge of the outer side surface of the wound layer and the third reference line or the fourth reference line, the third actual distance, and the fourth actual distance comprises:
  determining real-time position information of the edge of the other end of the first electrode plate based on the fifth actual number of pixels and the third actual distance;
  determining real-time position information of the edge of the other end of the first separator based on the sixth actual number of pixels and the third actual distance;
  determining real-time position information of the edge of the other end of the second electrode plate based on the seventh actual number of pixels and the fourth actual distance; and
  determining real-time position information of the edge of the other end of the second separator based on the eighth actual number of pixels and the fourth actual distance.

18. An electronic device, comprising:
at least one processor; and
a memory communicatively connected to the at least one processor and storing instructions that, when executed by the at least one processor, cause the at least one processor to perform the cell winding calibration method according to claim 1.

19. A cell winding calibration device, comprising a winding unit, a beam emission unit, an image acquisition unit, a control unit, and a calibration unit, wherein a winding unit configured to wind a winding substrate;

a beam emission unit disposed on one side of the winding unit, and configured to form a first reference line and a second reference line on the winding substrate, wherein the first reference line and the second reference line are parallel identification lines, a distance between the first reference line and the second reference line is a first reference distance, and the first reference distance remains unchanged in a cell winding process;

an image acquisition unit disposed on one side of the winding unit, and configured to perform image acquisition on the winding substrate;

a control unit configured to:

receive an acquired image from the image acquisition unit;

obtain, based on the acquired image, a reference number of pixels comprised in the first reference distance;

determine, based on the first reference distance and the reference number of pixels comprised in the first reference distance, an actual distance corresponding to a single pixel;

obtain, based on the acquired image, an actual number of pixels comprised in a distance between an edge of the winding substrate and the first reference line or the second reference line; and determine real-time position information of the edge of the winding substrate based on the actual number of pixels comprised in the distance between the edge of the winding substrate and the first reference line or the second reference line and the actual distance corresponding to the single pixel; and a calibration unit configured to receive the real-time position information of the edge of the winding substrate from the control unit and calibrate the winding substrate based on the real-time position information.

20. The cell winding calibration device according to claim 19, wherein a minimum recognition distance of the image acquisition unit is less than or equal to the first reference distance.

* * * * *